(12) United States Patent
Vassberg et al.

(10) Patent No.: US 10,954,805 B2
(45) Date of Patent: Mar. 23, 2021

(54) AIRCRAFT TURBOFAN ENGINE HAVING VARIABLE PITCH FAN AND METHOD OF OVER-PITCHING THE VARIABLE PITCH FAN IN AN ENGINE OUT CONDITION TO REDUCE DRAG

(71) Applicant: The Boeing Company, Chicago, IL (US)

(72) Inventors: John C. Vassberg, Long Beach, CA (US); Mark Dehaan, Rancho Palos Verdes, CA (US); Dino L. Roman, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 16/022,670

(22) Filed: Jun. 28, 2018

(65) Prior Publication Data

US 2020/0003063 A1  Jan. 2, 2020

(51) Int. Cl.
*F01D 7/00* (2006.01)
*F01D 9/04* (2006.01)
*F01D 21/14* (2006.01)

(52) U.S. Cl.
CPC .............. *F01D 7/00* (2013.01); *F01D 9/041* (2013.01); *F01D 21/14* (2013.01); *F05D 2220/323* (2013.01); *F05D 2260/74* (2013.01)

(58) Field of Classification Search
CPC . F01D 7/00; F01D 21/14; F01D 9/041; F05D 2220/323

USPC ......................................................... 416/147
See application file for complete search history.

(56) References Cited

U.S. PATENT DOCUMENTS

| 4,080,785 | A | * | 3/1978 | Koff ........................ F02K 3/075 |
| | | | | 415/69 |
| 4,155,221 | A | | 5/1979 | Dhoore et al. |
| 4,275,560 | A | * | 6/1981 | Wright .................... F02K 3/075 |
| | | | | 415/148 |
| 4,449,680 | A | | 5/1984 | Gratzer et al. |
| 7,669,785 | B2 | | 3/2010 | Shmilovich et al. |
| 2017/0218975 | A1 | * | 8/2017 | Bintz ......................... F02K 1/72 |
| 2018/0066671 | A1 | * | 3/2018 | Murugan ............ F04D 27/0246 |
| 2018/0128182 | A1 | * | 5/2018 | Hayama ................... F02C 7/262 |
| 2020/0003063 | A1 | * | 1/2020 | Vassberg ................... F01D 7/00 |
| 2020/0016633 | A1 | * | 1/2020 | Wang ....................... B08B 9/00 |
| 2020/0040743 | A1 | * | 2/2020 | Osgood .................... F01D 5/186 |

* cited by examiner

*Primary Examiner* — J. Todd Newton

(57) ABSTRACT

There is provided a turbofan engine for an aircraft. The turbofan engine has a core with a fan cowl and a variable pitch fan (VPF) configured to only rotate in a first rotation direction. The VPF has a plurality of fan blades each configured to over-pitch to an over-pitch position relative to a feathered position. The turbofan engine has outer guide vanes (OGVs) axially disposed downstream of the VPF, and has a rotation control device to prevent the VPF from rotating in a second rotation direction opposite the first rotation direction, during an engine out (EO) condition of the turbofan engine. When the VPF is prevented from rotating during the EO condition, the fan blades are over-pitched to the over-pitch position relative to the feathered position, to achieve no or minimal air flow separation about the OGVs, and to reduce drag of the turbofan engine during the EO condition.

20 Claims, 16 Drawing Sheets

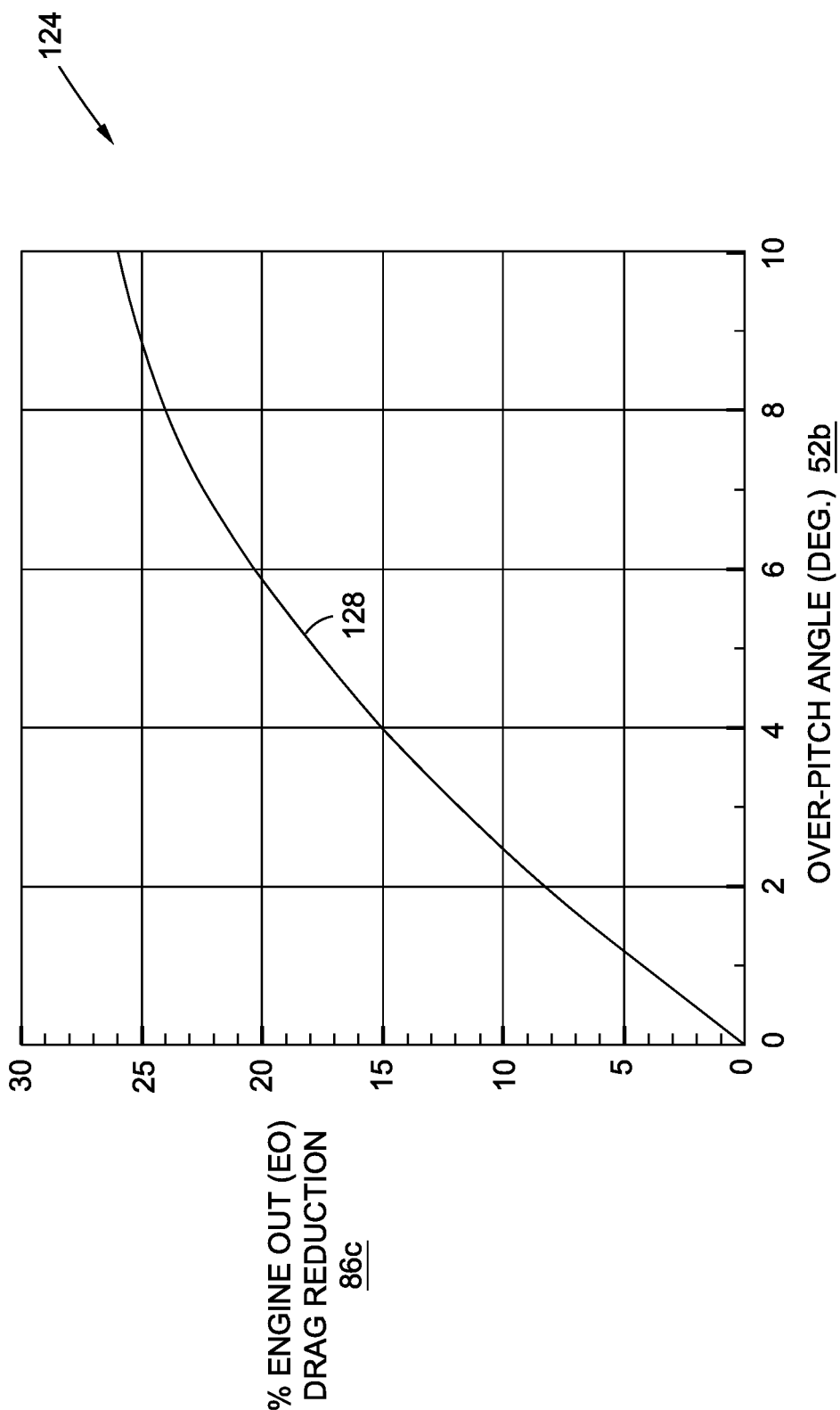

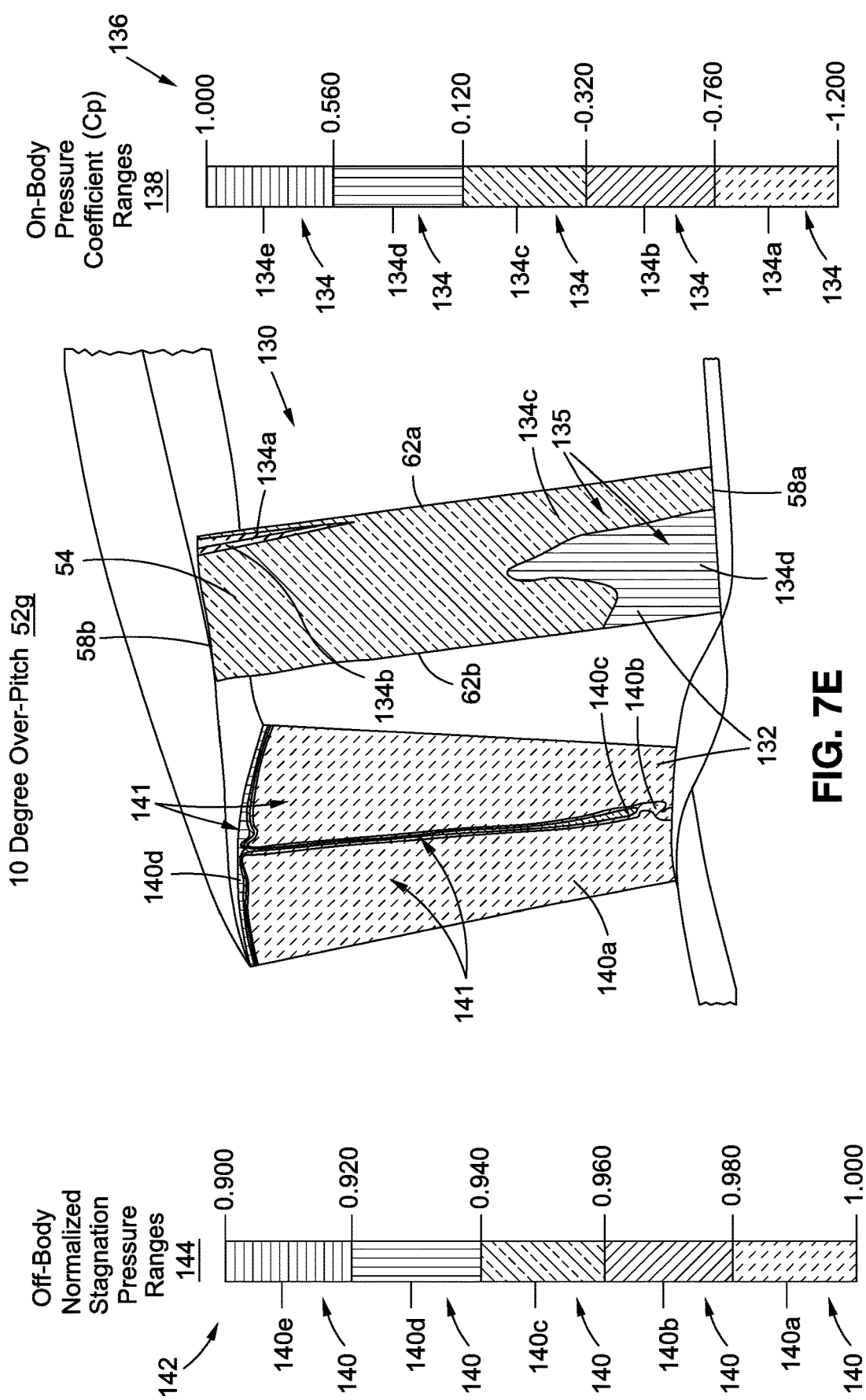

AIRCRAFT TURBOFAN ENGINE HAVING VARIABLE PITCH FAN AND METHOD OF OVER-PITCHING THE VARIABLE PITCH FAN IN AN ENGINE OUT CONDITION TO REDUCE DRAG

BACKGROUND

1) Field of the Disclosure

The disclosure relates generally to turbofan engines and methods of using the same, and more particularly, to aircraft turbofan engines having a variable pitch fan and methods of using the same in an engine out (EO) condition to reduce drag.

2) Description of Related Art

Large commercial transport aircraft may be equipped with two or more turbofan engines, such as very-high-bypass-ratio turbofan engines, for propulsion. Such very-high-bypass-ratio turbofan engines typically use fans and fan cowls with very large diameters. When a turbofan engine, such as very-high-bypass-ratio turbofan engine, fails or becomes inoperative during flight of the aircraft, a condition referred to as an "engine out (EO) condition", it is necessary to shut down the failed or inoperative engine. However, even with the engine shut down, the fan may still experience spinning due to oncoming air flow, i.e., "wind-milling". Such oncoming air flow may flow past a series of outer guide vanes (OGVs) in the engine, located downstream of the fan, and if this air flow separates behind the OGVs, such air flow separation may block the air flow from passing through the engine, and the air flow that spills outside and around the engine may cause substantial unwanted drag during the engine out (EO) condition.

Known systems and methods exist to stop the fan of a turbofan engine, such as very-high-bypass-ratio turbofan engine, from spinning during an engine out (EO) condition. One known system and method includes using a variable pitch fan (VPF) engine instead of a fixed-pitch-fan (FPF) engine, and feathering the fan blades of the variable pitch fan (VPF) engine during the engine out (EO) condition, so that a feathered position, i.e., zero torque around the spin axis, is such that a free-wheeling or free spinning fan will not spin during the engine out (EO) condition. However, the feathered fan blades may still generate swirl, e.g., swirling air flow, which may cause air flow separation behind the outer guide vanes (OGVs), and in turn, may cause unwanted drag during the engine out (EO) condition.

Accordingly, there is a need in the art for a turbofan engine, such as a very-high-bypass-ratio turbofan engine, that uses a fan, such as a variable pitch fan (VPF), and a drag reduction system and method, to significantly reduce drag during an engine out (EO) condition, and to provide significant advantages over known systems and methods.

SUMMARY

Example implementations of this disclosure provide for such a turbofan engine that uses a fan, such as a variable pitch fan (VPF), and a drag reduction system and method to significantly reduce drag during an engine out (EO) condition. As discussed in the below detailed description, versions of the turbofan engine with the drag reduction system and method of using the same may provide significant advantages over known systems and methods.

In one version there is provided a turbofan engine for an aircraft. The turbofan engine comprises a core with a fan cowl surrounding a portion of the core. The core has a first end and a second end.

The turbofan engine further comprises a variable pitch fan (VPF) coupled to the first end of the core and configured to only rotate in a first rotation direction. The variable pitch fan has a plurality of fan blades extending radially outward from the core to the fan cowl. The plurality of fan blades are each configured to over-pitch to an over-pitch position relative to a feathered position of the variable pitch fan.

The turbofan engine further comprises a plurality of outer guide vanes (OGVs) axially disposed downstream of the variable pitch fan. Each of the plurality of outer guide vanes is nonrotatable and extends radially outward from the core to the fan cowl.

The turbofan engine further comprises a rotation control device coupled to the variable pitch fan, to prevent the variable pitch fan from rotating in a second rotation direction opposite the first rotation direction, during an engine out (EO) condition of the turbofan engine for the aircraft. When the variable pitch fan is prevented from rotating in the second rotation direction during the engine out (EO) condition, the plurality of fan blades are over-pitched to the over-pitch position relative to the feathered position, to achieve no or minimal air flow separation about the plurality of outer guide vanes, and to reduce drag of the turbofan engine during the engine out (EO) condition.

In another version there is provided an aircraft. The aircraft comprises a fuselage, a first wing and a second wing, each attached to the fuselage, and a first turbofan engine attached to the first wing and a second turbofan engine attached to the second wing.

Each turbofan engine comprises a core with a fan cowl surrounding a portion of the core. The core has a first end and a second end.

Each turbofan engine further comprises a drag reduction system. The drag reduction system comprises a variable pitch fan (VPF) coupled to the first end of the core and configured to only rotate in a first rotation direction. The variable pitch fan has a plurality of fan blades extending radially outward from the core to the fan cowl. The plurality of fan blades are each configured to over-pitch to an over-pitch position relative to a feathered position of the variable pitch fan.

The drag reduction system of each turbofan engine further comprises a plurality of outer guide vanes (OGVs) axially disposed downstream of the variable pitch fan. Each of the plurality of outer guide vanes is nonrotatable and extends radially outward from the core to the fan cowl. Each of the plurality of outer guide vanes has a thickness to chord (t/c) ratio in a range of from 3% to 9%.

The drag reduction system of each turbofan engine further comprises a rotation control device coupled to the variable pitch fan, to prevent the variable pitch fan from rotating in a second rotation direction opposite the first rotation direction, during an engine out (EO) condition of one of, the first turbofan engine or the second turbofan engine, of the aircraft. When the variable pitch fan is prevented from rotating in the second rotation direction during the engine out (EO) condition, the plurality of fan blades are over-pitched to the over-pitch position relative to the feathered position, to achieve no or minimal air flow separation about the plurality of outer guide vanes, and to reduce an engine out (EO) drag.

In yet another version there is provided a method of over-pitching a variable pitch fan (VPF) of a turbofan engine of an aircraft in an engine out (EO) condition to reduce drag. The method comprises the step of installing two or more turbofan engines on the aircraft.

Each turbofan engine comprises a core with a fan cowl surrounding a portion of the core. The core has a first end and a second end. Each turbofan engine further comprises a variable pitch fan coupled to the first end of the core and configured to only rotate in a first rotation direction. The variable pitch fan has a plurality of fan blades extending radially outward from the core to the fan cowl, the plurality of fan blades each configured to over-pitch to an over-pitch position relative to a feathered position of the variable pitch fan.

Each turbofan engine further comprises a plurality of outer guide vanes (OGVs) axially disposed downstream of the variable pitch fan. Each of the plurality of outer guide vanes is nonrotatable and extends radially outward from the core to the fan cowl. Each turbofan engine further comprises a rotation control device coupled to the variable pitch fan, to prevent the variable pitch fan from rotating in a second rotation direction opposite the first rotation direction, in an engine out (EO) condition of at least one turbofan engine of the two or more turbofan engines of the aircraft.

The method further comprises the step of using the rotation control device to prevent the variable pitch fan from rotating in the second rotation direction, in the engine out (EO) condition of the at least one turbofan engine. The method further comprises the step of over-pitching the variable pitch fan by over-pitching the plurality of fan blades to the over-pitch position relative to the feathered position, in the engine out (EO) condition, to achieve no or minimal air flow separation about the plurality of outer guide vanes, and to reduce drag of the at least one turbofan engine in the engine out (EO) condition.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 5 is an illustration of a graph showing the results of an over-pitch past feather effect on engine out (EO) drag at an ETOPS condition, using a powered simulation and a powered model;

FIGS. 7A-7E are illustrations of a powered model used in a powered simulation, showing a side close-up view of an outer guide vane (OGV), and showing the effect of varying over-pitch on air flow separation behind the OGV;

Each figure shown in this disclosure shows a variation of an aspect of the versions or embodiments presented, and only differences will be discussed in detail.

DETAILED DESCRIPTION

Disclosed versions or embodiments will now be described more fully hereinafter with reference to the accompanying drawings, in which some, but not all of the disclosed versions or embodiments are shown. Indeed, several different versions or embodiments may be provided and should not be construed as limited to the versions or embodiments set forth herein. Rather, these versions or embodiments are provided so that this disclosure will be thorough and fully convey the scope of the disclosure to those skilled in the art.

Figure 1A:
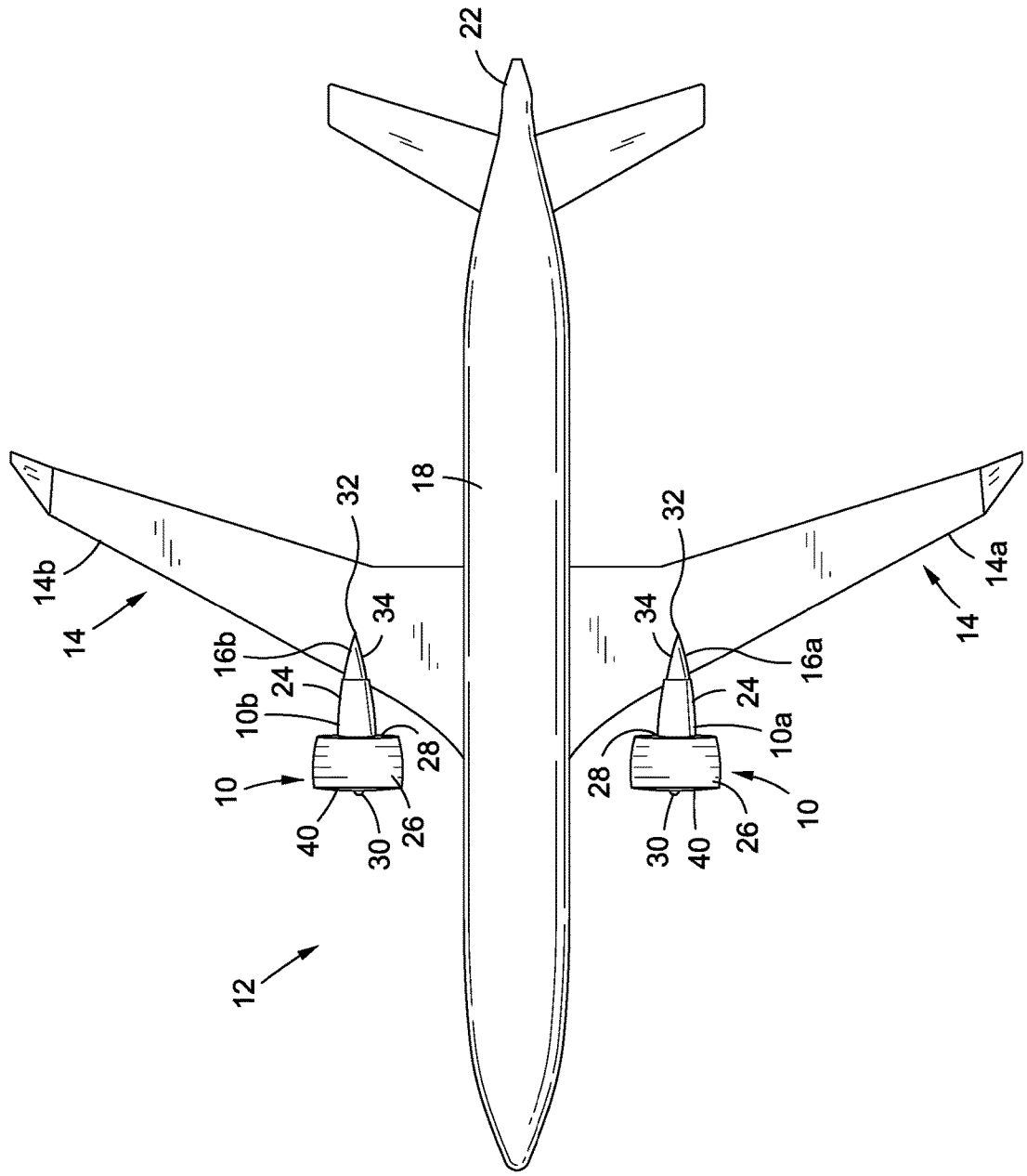
FIG. 1A is an illustration of a bottom plan view of an aircraft having a version of a turbofan engine, as disclosed herein.
Figure 1B:
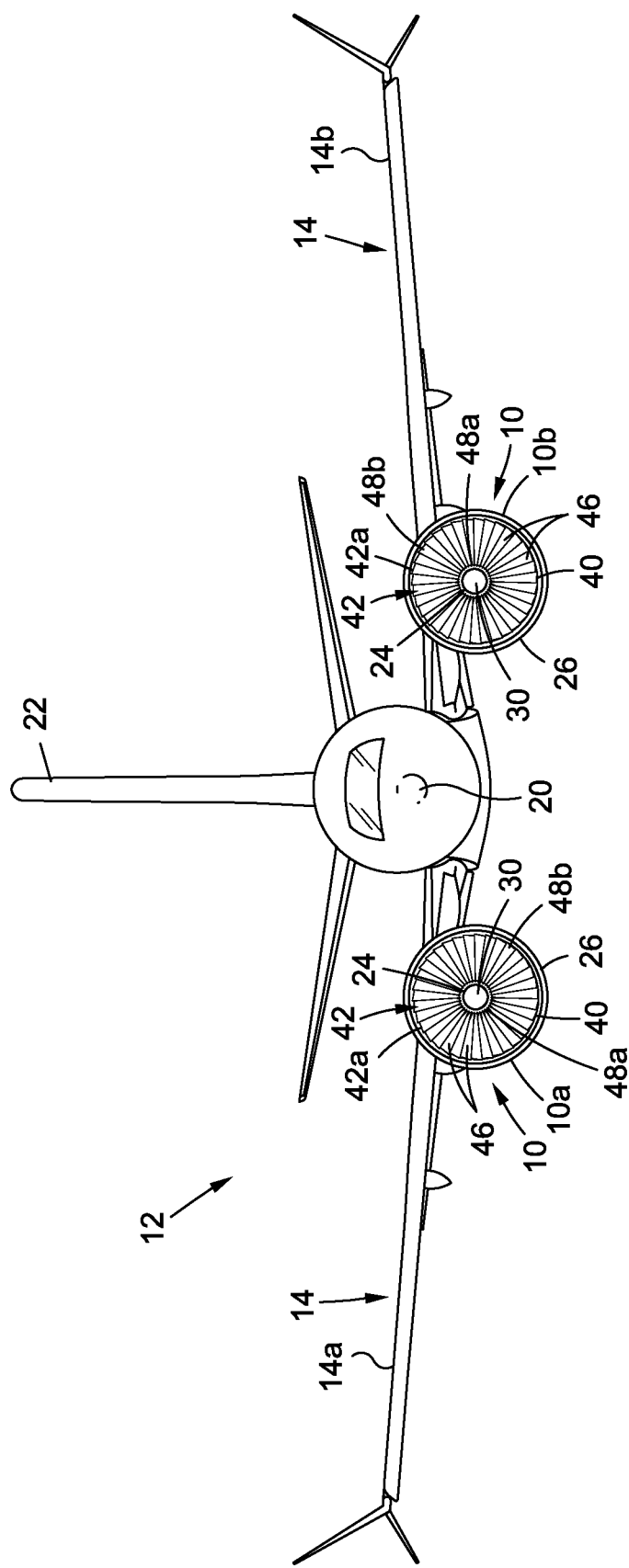
FIG. 1B is an illustration of a front view of the aircraft with the turbofan engine of FIG. 1A.
Figure 1C:
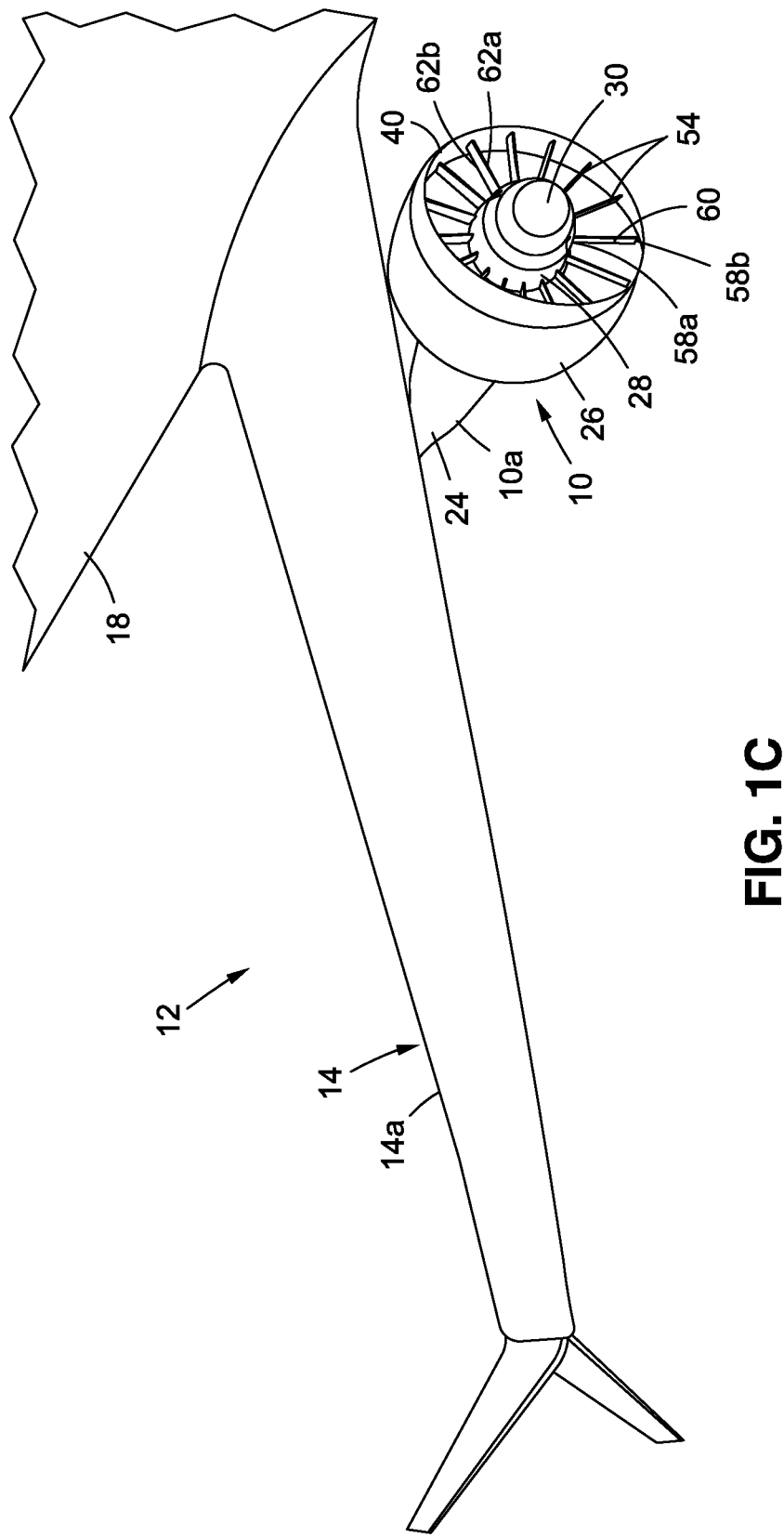
FIG. 1C is an illustration of an enlarged side perspective view of a turbofan engine and a wing of the aircraft of FIG. 1B, with the variable pitch fan (VPF) removed.
Figure 1D:
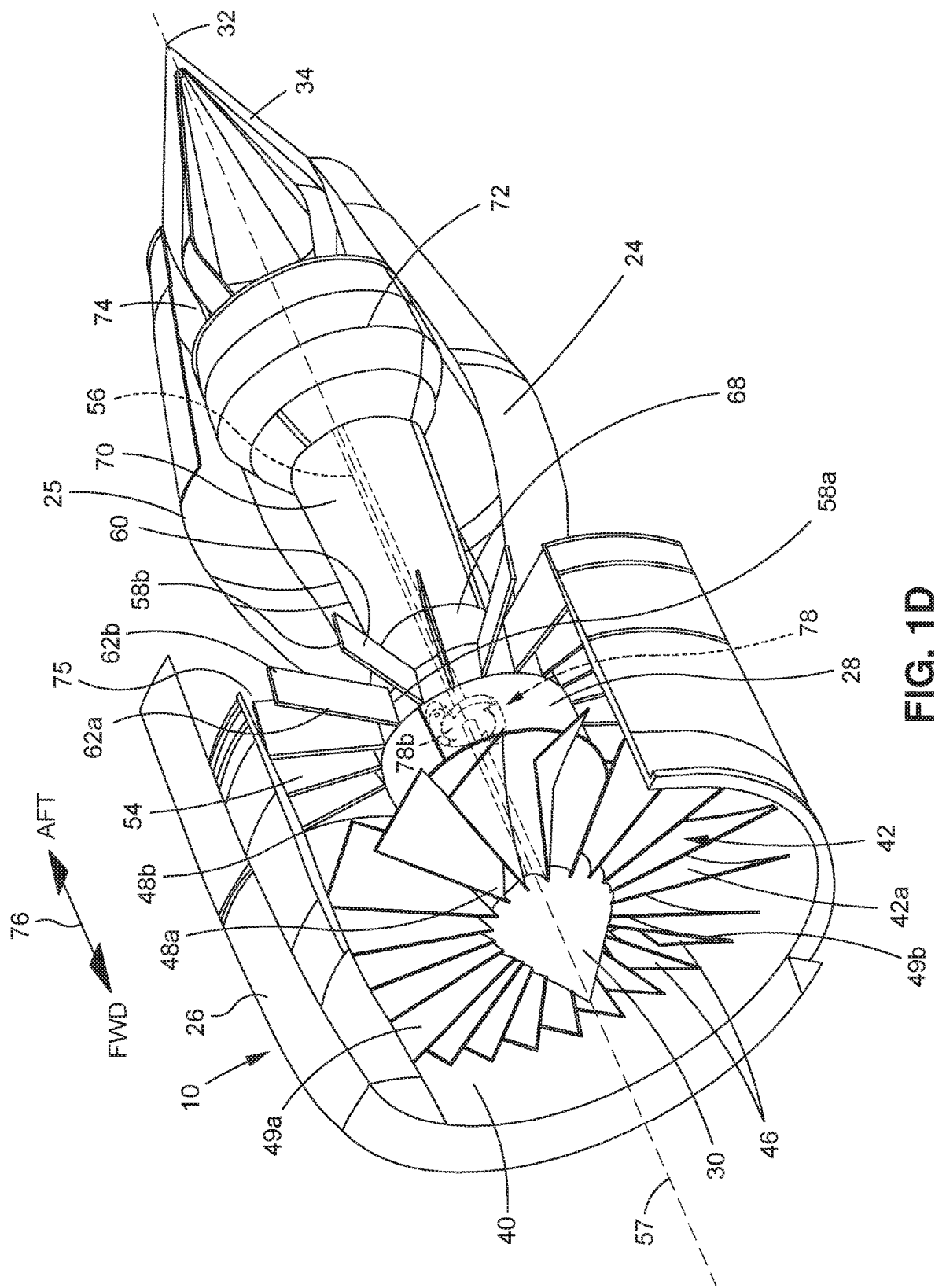
FIG. 1D is an illustration of an enlarged side perspective cutaway view of a version of a turbofan engine of the disclosure.
Figure 2:
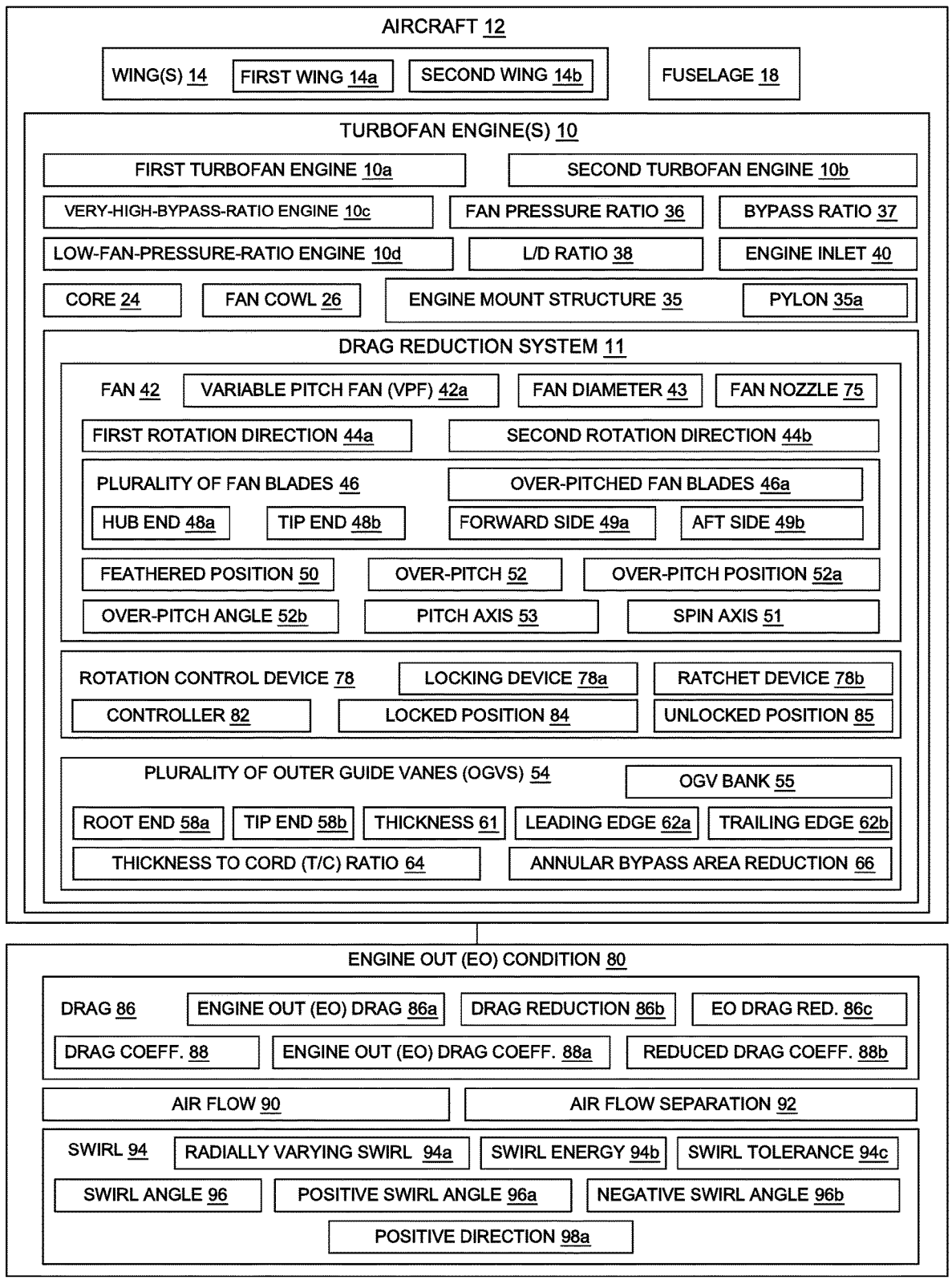
FIG. 2 is an illustration of a functional block diagram showing an aircraft having a version of a turbofan engine with a drag reduction system, as disclosed herein.

Now referring to the Figures, and in particular, with reference to FIGS. 1A-1D and FIG. 2, in one version of the disclosure there is provided a turbofan engine 10 for an aircraft 12 where the turbofan engine 10 has a drag reduction system 11 (see FIG. 2) including a variable pitch fan (VPF) 42a that is configured to be locked from spinning and that is configured to be over-pitched during an engine out (EO) condition 80 (see FIG. 2) to reduce drag 86 (see FIG. 2), such as engine out (EO) drag 86a (see FIG. 2). As used herein, "engine out (EO) condition" means in an aircraft having two or more turbofan engines, the condition where one of the turbofan engines fails or becomes inoperative during operation of the aircraft, including during take-off, climb, cruise, turn, and landing, of the aircraft.

As used herein, "drag" means the aerodynamic force or resistance force that opposes an aircraft's motion or flight direction through the air. As used herein, "engine out (EO) drag" means additional drag that occurs during an engine out (EO) condition, and includes air flow separation past the outer guide vanes (OGVs) in the turbofan engine. This blocks most of the air flow from passing through the turbofan engine, and causes air flow to spill outside and around the turbofan engine, resulting in increased drag of the turbofan engine.

FIG. 1A is an illustration of a bottom plan view of an aircraft 12 having a version of the turbofan engine 10, as disclosed herein. FIG. 1B is an illustration of a front view of the aircraft 12 with the turbofan engines 10 of FIG. 1A. FIG. 1C is an illustration of an enlarged side perspective view of a turbofan engine 10 and a wing 14 of the aircraft 12 of FIG.

1B, with the variable pitch fan (VPF) removed. FIG. 1D is an illustration of an enlarged side perspective cutaway view of a version of a turbofan engine 10 of the disclosure. FIG. 2 is an illustration of a functional block diagram showing an aircraft 12 having a version of a turbofan engine 10 with a drag reduction system 11, as disclosed herein.

As shown in FIGS. 1A-1B and FIG. 2, the aircraft 12 has two turbofan engines 10, including a first turbofan engine 10a and a second turbofan engine 10b. The turbofan engines 10 (see FIGS. 1A-1CC, 2) are coupled to wings 14 (see FIGS. 1A-1C, 2), such as a first wing 14a (see FIGS. 1A-1C, 2) and a second wing 14b (see FIGS. 1A-1B, 2). As shown in FIG. 1A, the first turbofan engine 10a is coupled to a bottom portion 16a of the first wing 14a, and the second turbofan engine 10 is coupled to a bottom portion 16b of the second wing 14b. Although the turbofan engines 10 are shown coupled to the bottom portion 16b of the wings 14 in FIGS. 1A-1C, the turbofan engines 10 are not limited to under-wing mounting and may be mounted to the top of the wing, to the fuselage, for example, the aft fuselage, to the tail, or to another suitable location on the aircraft 12.

The aircraft 12 (see FIGS. 1A-1C, 2) further has a fuselage 18 (see FIGS. 1A-1C, 2), a nose section 20 (see FIGS. 1A-1B), and a tail section 22 (see FIGS. 1A-1B). As shown in FIGS. 1A-1B, the wings 14, such as the first wing 14a and the second wing 14b, are each attached to, and extend outwardly from, the fuselage 18.

As shown in FIGS. 1A-1D and FIG. 2, each turbofan engine 10 comprises a core 24 with a fan cowl 26 surrounding a portion 28 (see FIGS. 1A, 1C, 2) of the core 24. The fan cowl 26 (see FIG. 1A) may also be referred to as a nacelle or an engine casing. The core 24 (see FIG. 1D) has a core structure 25 (see FIG. 1D). The core 24 (see FIGS. 1A-1D, 2) has a first end 30 (see FIGS. 1A-1D, 2) and a second end 32 (see FIGS. 1A, 1D, 2). The core 24 (see FIGS. 1A, 1D, 2) is preferably tapered at the second end 32 to form a tapered end portion 34 (see FIGS. 1A, 1D, 2). The tapered end portion 34 of the core 24 of the turbofan engine 10 is preferably mounted to each wing 14 (see FIGS. 1A, 2), via an engine mount structure 35 (see FIG. 2), such as a pylon 35a (see FIG. 2), or another suitable engine mount structure 35.

Each turbofan engine 10 (see FIGS. 1A, 2) may comprise a very-high-bypass-ratio engine 10c (see FIG. 2), also referred to as an ultra-high-bypass-ratio engine. The very-high-bypass-ratio engine 10c (see FIG. 2) preferably has a fan pressure ratio 36 (see FIG. 2) in a range of from 1.10 to 1.30. Other fan pressure ratios 36 outside the 1.10 to 1.30 range may also be suitable. As used herein, "fan pressure ratio" means in a turbofan engine of an aircraft, the ratio of outer guide vane (OGV) discharge stagnation pressure to a fan inlet stagnation pressure.

The very-high-bypass-ratio engine 10c (see FIG. 2) preferably has a bypass ratio 37 (see FIG. 2) in a range of from 15 to 50, and more preferably, has a bypass ratio 37 (see FIG. 2) in a range of 30 to 35. Other bypass ratios 37 (see FIG. 2) outside the 15 to 50 range may also be suitable. As used herein, "bypass ratio" means in a turbofan engine of an aircraft, the ratio of the amount of stream tube air flow that is bypassed around the core of the turbofan engine to the amount of air flow that passes through the core, where "stream tube air flow" means all the air flow that enters through an engine inlet.

Each turbofan engine 10 (see FIGS. 1A, 2) may further comprise a low-fan-pressure-ratio engine 10d (see FIG. 2). The low-fan-pressure-ratio engine 10d (see FIG. 2) preferably has a length to diameter (L/D) ratio 38 (see FIG. 2) of a length of the fan cowl 26 (see FIGS. 1A, 1B, 1D, 2) to a diameter of the fan cowl 26 of the turbofan engine 10 (see FIGS. 1B, 2), in a range of from 0.6 to 1.0. Other L/D ratios 38 (see FIG. 2) outside the 0.6 to 1.0 range may also be suitable.

As shown in FIGS. 1B, 1D, and FIG. 2, the turbofan engine 10 further comprises a fan 42, such as in the form of a variable pitch fan (VPF) 42a. Each turbofan engine 10 (see FIGS. 1A, 2) preferably comprises a gas turbine engine that achieves mechanical energy from combustion and that drives the fan 42, such as the variable pitch fan (VPF) 42a, to accelerate air flow 90 (see FIG. 2) rearwards. The fan 42, such as the variable pitch fan 42a, may have a large frontal area, and may have a fan diameter 43 (see FIG. 2) in a range of 80 inches to 135 inches. This fan diameter range is generally for a class of aircraft that requires about 30,000 pounds of sea-level static thrust at takeoff. Other fan diameters outside the 80 inches to 135 inches range may also be suitable.

The fan 42 (see FIGS. 1B, 1D, 2), such as in the form of the variable pitch fan 42a (see FIGS. 1B, 1D, 2), is coupled to the first end 30 (see FIGS. 1B, 1D, 2) of the core 24. The fan 42, such as in the form of the variable pitch fan 42a, is preferably configured to only rotate in a first rotation direction 44a (see FIG. 2). The first rotation direction 44a (see FIG. 2) preferably comprises a typical or normal operating rotation direction during a normal or typical operating condition of the fan 42, such as the variable pitch fan 42a, during flight operation of the aircraft 12. The core 24 (see FIG. 1D, of the turbofan engine 10 (see FIGS. 1D, 2) preferably, generates enough power to drive the fan 42 (see FIGS. 1D, 2), such as the variable pitch fan 42a (see FIGS. 1D, 2), at its design flow and fan pressure ratio 36 (see FIG. 2).

As shown in FIGS. 1B, 1D, and FIG. 2, the fan 42, such as in the form of the variable pitch fan 42a, has a plurality of fan blades 46. Each fan blade 46 (see FIGS. 1B, 1D, 2) extends radially outward from the core 24 (see FIGS. 1B, 1D, 2) to the fan cowl 26 (see FIGS. 1B, 1D, 2). Each fan blade 46 (see FIGS. 1B, 1D, 2) has a hub end 48a (see FIGS. 1B, 1D, 2) coupled to the core 24 (see FIGS. 1B, 1D, 2), and has a tip end 48b (see FIGS. 1B, 1D, 2) terminating near the inside of the fan cowl 26 (see FIGS. 1B, 1D, 2). Each fan blade 46 (see FIGS. 1D, 2) further has a forward side 49a (see FIGS. 1D, 2) facing the engine inlet 40 (see FIGS. 1D, 2), and an aft side 49b (see FIGS. 1D, 2) facing a plurality of outer guide vanes (OGVs) 54 (see FIGS. 1D, 2).

As disclosed herein, the plurality of fan blades 46 (see FIGS. 1B, 1D, 2) are each configured to over-pitch, or configured to be over-pitched, to an over-pitch position 52a (see FIG. 2) relative to a feathered position 50 (see FIG. 2), such as beyond or past a feathered position 50 (see FIG. 2), of the variable pitch fan 42a (see FIGS. 1B, 1D, 2), to obtain over-pitched fan blades 46a (see FIG. 2). Each of the plurality of fan blades 46 (see FIGS. 1B, 1D, 2) is preferably configured to over-pitch, or configured to be over-pitched, to the over-pitch position 52a (see FIG. 2) relative to the feathered position 50 (see FIG. 2), such as beyond or past the feathered position 50 (see FIG. 2), of the variable pitch fan 42a (see FIGS. 1B, 1D, 2), by an over-pitch 52 (see FIG. 1D, 2) or over-rotation, in a range of from 1 degree over-pitch to 10 degrees over-pitch. More preferably, each of the plurality of fan blades 46 is preferably configured to over-pitch, or configured to be over-pitched, to the over-pitch position 52a (see FIG. 2) relative to the feathered position 50 (see FIG. 2), such as beyond or past the feathered position 50 (see FIG.

2), of the variable pitch fan 42*a*, by an over-pitch 52 (see FIG. 2), or over-rotation, of 10 degrees over-pitch.

As used herein, "feathered position" means the pitch of a fan blade rotates to a point where the torque around a spin axis of the turbofan engine from oncoming air flow hitting the fan blade integrates to zero, and thus the feathered position is zero torque around the spin axis, and such that a free-wheeling fan does not spin during an engine out (EO) condition. For powered simulations 132 (see FIGS. 6A-7E), discussed in detail below, the feathered position 50 (see FIG. 2) for each fan blade 46 (see FIG. 2) in the engine out (EO) condition 80 (see FIG. 2) was about a 35 degree rotation about the pitch axis 53 (see FIG. 2) of each fan blade 46, and swirl 94 (see FIG. 2) that was generated behind the fan blade 46 (see FIGS. 1D, 2) was a distribution that started out at about +25 (+/−2) degrees at the hub end 48*a* (see FIG. 1D, 2) of each fan blade 46 and about −12 (+/−2) degrees at the tip end 48*b* (see FIGS. 1D, 2) of each fan blade 46.

As used herein, "over-pitch" means over-rotating the fan blades of a fan, such as a variable pitch fan, a desired amount of pitch or rotation, in degrees, to an over-pitch position relative to the feathered position, such as beyond or past the feathered position, including a feathered position of about a 35-40 degree rotation about the pitch axis, for example, a 35 degree rotation about the pitch axis, and to bias in a positive direction resulting swirl generated aft of the fan, such as the variable pitch fan.

As used herein, "swirl" means a circumferential flow component of an absolute velocity vector and it is a by-product flow generated by the fan of a turbofan engine performing work on the air flow that flows into the fan. As used herein, "swirl angle" means an amount of rotation that occurs in the swirl as it is generated by the fan of the turbofan engine and passes over the outer guide vanes (OGVs) and through the turbofan engine.

For example, the fan 42 (see FIG. 2), such as a variable pitch fan (VPF) 42*a* (see FIG. 2), of a very-high-bypass-ratio engine 10*c* (see FIG. 2) having a fan pressure ratio 36 (see FIG. 2) of about 1.15 at cruise conditions may generate swirl 94 (see FIG. 2) having a positive swirl angle 96*a* (see FIG. 2) of about 15 degrees, as compared to a fan of a very-high-bypass-ratio engine having a fan pressure ratio of about 1.5 at cruise conditions, which may generate swirl having a positive swirl angle of about 45 degrees.

As shown in FIGS. 1C, 1D, and FIG. 2, each turbofan engine 10 further comprises the plurality of outer guide vanes (OGVs) 54 axially disposed downstream of the fan 42 (see FIG. 1D, 2), such as the variable pitch fan 42*a* (see FIGS. 1D, 2). In FIG. 1C, the fan 42 (see FIG. 1B), such as the variable pitch fan 42*a* (see FIG. 1B), is removed to show the outer guide vanes (OGVs) 54. A primary aerodynamic purpose of the outer guide vanes (OGVs) 54 is to remove the swirl 94 (see FIG. 2) from the air flow 90 (see FIG. 2), which swirl 94 is induced by the fan 42 (see FIG. 2), such as the variable pitch fan (VPF) 42*a* (see FIG. 2), because the swirl 94 has a swirl energy 94*b* (see FIG. 2) that may be lost in the thrust direction, if the swirl energy 94*b* is not redirected, so that the air flow 90 flows back without the swirl 94 in the air flow 90.

The plurality of outer guide vanes (OGVs) 54 (see FIGS. 1C, 1D, 2) and the plurality of fan blades 46 (see FIGS. 1D, 2) are both axially disposed around at least one central shaft 56 (see FIG. 1D) in the core 24 (see FIG. 1D), which is aligned along a longitudinal center axis 57 (see FIG. 1D) of the turbofan engine 10. Each of the plurality of outer guide vanes (OGVs) 54 (see FIGS. 1C, 1D, 2) is nonrotatable and each extends radially outward from the core 24 (see FIGS. 1C, 1D, 2) to the fan cowl 26 (see FIGS. 1C, 1D, 2).

As shown in FIGS. 1C, 1D, and FIG. 2, each outer guide vane (OGV) 54 has a root end 58*a* coupled to the core 24, and each outer guide vane (OGV) 54 has a tip end 58*b* coupled to the fan cowl 26. Each outer guide vane (OGV) 54 (see FIGS. 1C, 1D, 2) further has a body 60 (see FIGS. 1C, 1D, 2) that extends between the root end 58*a* and the tip end 58*b*. Each outer guide vane (OGV) 54 (see FIGS. 1C, 1D, 2) further has a thickness 61 (see FIG. 2). Each outer guide vane (OGV) 54 (see FIGS. 1C, 1D, 2) further has a leading edge 62*a* (see FIGS. 1C, 1D, 2) and a trailing edge 62*b* (see FIGS. 1C, 1D, 2). As shown in FIG. 1D, the core 24 is preferably tapered at the second end 32, such that there is an annular bypass area reduction 66 (see also FIG. 2) between the leading edge 62*a* and the trailing edge 62*b* of each of the plurality of outer guide vanes (OGVs) 54.

The plurality of outer guide vanes (OGVs) 54 (see FIGS. 1C, 1D) preferably comprise a total number of OGVs 54 in a range of from 3 OGVs 54 to 24 OGVs 54. More preferably, the plurality of outer guide vanes (OGVs) 54 preferably comprise a total number of OGVs 54 in a range of from 16 OGVs 54 to 24 OGVs 54. Each of the plurality of outer guide vanes (OGVs) 54 (see FIGS. 1C, 1D, 2) preferably has a thickness to chord (t/c) ratio 64 (see FIG. 2) in a range of from 3% to 9%. The thickness to chord (t/c) ratio 64 (see FIG. 2) of the OGVs 54 (see FIG. 2) may be a design variable that relates to swirl tolerance 94*c* (see FIG. 2). For example, if an OGV 54 design having a swirl tolerance 94*c* that is increased or greater is desired, an OGV 54 with a higher thickness to chord (t/c) ratio 64, such as 9%, where the OGV 54 is thicker, may be preferred. Alternatively, if an OGV 54 design does not need a swirl tolerance 94*c* that is increased or greater due to the amount of over-pitch 52 (see FIG. 2) of the variable pitch fan 42*a* (see FIG. 2) or due to the fan pressure ratio 36 (see FIG. 2) of the turbofan engine 10, an OGV 54 with a lower thickness to chord (t/c) ratio 64, such as 4% or 3%, where the OGV 54 is thinner, may be preferred. The thickness of the OGV 54 is less of a factor as the fan pressure ratio 36 of the turbofan engine 10 decreases.

As shown in FIG. 1D, the turbofan engine 10 further comprises a rotation control device 78 coupled to the fan 42, such as the variable pitch fan 42*a*, to prevent the fan 42, such as the variable pitch fan 42*a*, from rotating in a second rotation direction 44*b* (see FIG. 2) opposite the first rotation direction 44*a* (see FIG. 2), during an engine out (EO) condition 80 (see FIG. 2) of the turbofan engine 10 for the aircraft 12 (see FIG. 2). The rotation control device 78 (see FIGS. 1D, 2) may comprise a locking device 78*a* (see FIG. 2), a ratchet device 78*b* (see FIG. 2), or another suitable rotation control device 78 that prevents the fan 42 (see FIG. 2), such as the variable pitch fan 42*a* (see FIG. 2), from rotating or spinning in the second rotation direction 44*b* (see FIG. 2), which is the opposite direction from the first rotation direction 44*a*. The rotation control device 78 (see FIGS. 1D, 2) may be coupled to the portion of the central shaft 56 (see FIG. 1D) coupled to the fan 42 (see FIG. 1D), such as the variable pitch fan 42*a* (see FIG. 1D), or the rotation control device 78 may be coupled to the hub end 48*a* (see FIG. 1D) of each fan blade 46 (see FIG. 1D) or one or more fan blades 46, or the rotation control device 78 may be coupled to another suitable location configured to control, lock, or stop the fan 42, such as the variable pitch fan 42*a*, from rotating in the second rotation direction 44*b* (see FIG. 2) opposite the first rotation direction 44*a* (see FIG. 2), during the engine out (EO) condition 80 (see FIG. 2) of the turbofan engine 10. The rotation control device 78 (see FIGS. 1D, 2) may be automatically and/or remotely controlled via a controller 82 (see FIG. 2) that activates and controls the rotation control device 78 when a turbofan engine 10 experiences an engine out (EO) condition 80 (see FIG. 2).

When the fan 42 (see FIG. 2), such as the variable pitch fan 42a (see FIG. 2), is prevented from rotating in the second rotation direction 44b (see FIG. 2), and is in a locked position 84 (see FIG. 2), during the engine out (EO) condition 80 (see FIG. 2), the plurality of fan blades 46 (see FIG. 2) are over-pitched to an over-pitch position 52a (see FIG. 2) relative to the feathered position 50 (see FIG. 2), such as beyond or past the feathered position 50, of the variable pitch fan 42a (see FIG. 2), to achieve no or minimal air flow separation 92 (see FIG. 2) about the plurality of outer guide vanes (OGVs) 54 (see FIG. 2), and to reduce drag 86 (see FIG. 2), such as engine out (EO) drag 86a (see FIG. 2), of the turbofan engine 10 during the engine out (EO) condition 80. When the drag 86 (see FIG. 2), such as the engine out (EO) drag 86a (see FIG. 2), is reduced, the drag coefficient 88 (see FIG. 2), such as the engine out (EO) drag coefficient 88a (see FIG. 2), of the turbofan engine 10 is reduced. For example, the drag 86 (see FIG. 2) may be reduced by a factor of one-third (⅓) or less, as compared to the drag for known turbofan engines without a locked and over-pitched variable pitch fan.

Thus, during the engine out (EO) condition 80 (see FIG. 2), the fan 42 (see FIG. 2), such as the variable pitch fan 42a (see FIG. 2), may be automatically locked from spinning or rotating, and then the plurality of fan blades 46 (see FIG. 2) may be over-pitched to an over-pitch position 52a (see FIG. 2) relative to the feathered position 50 (see FIG. 2), and resulting swirl 94 (see FIG. 2) aft of the fan 42, such as the variable pitch fan 42a, is biased in a positive direction 98a (see FIG. 2). Under this condition, the swirl angle 96 (see FIG. 2) is a positive swirl angle 96a (see FIG. 2) with a large positive value at the root end 58a (see FIG. 2), or hub end, of the outer guide vanes (OGVs) 54 (see FIG. 2) in the outer guide vane (OGV) bank 55 (see FIG. 2), and the swirl angle 96 (see FIG. 2) is a negative swirl angle 96b (see FIG. 2) with a manageably small negative value at the tip end 58b (see FIG. 2) of the OGVs 54 in the OGV bank 55. Since the OGVs 54 have a strong cascade effect at the root end 58a, or hub end, the air flow 90 (see FIG. 2) there may make the turn around the OGV 54 without separating. Further, since the swirl 94 at the tip end 58b of the OGV 54 is a manageably small negative value or angle, the air flow 90 also traverses the OGV 54 without separating. This allows the turbofan engine 10 (see FIG. 1) to breathe to the maximum extent possible and any resulting spillage drag may be kept to an insignificant value or amount. The drag reduction system 11 (see FIG. 2) of the turbofan engine 10 (see FIG. 2) provides a drag reduction 86b (see FIG. 2), such as an engine out (EO) drag reduction 86c (see FIG. 2), that is over three times lower than turbofan engines without the drag reduction system 11.

As shown in FIG. 1D, in one version, the turbofan engine 10 may further comprise a compressor portion 68 positioned downstream of the plurality of outer guide vanes (OGVs) 54, a combustor portion 70 positioned downstream of the compressor portion 68, a turbine portion 72 positioned downstream of the combustor portion 70, a core nozzle 74, and a fan nozzle 75. As shown in FIG. 1D, the fan 42, such as the variable pitch fan 42a, the plurality of outer guide vanes (OGVs) 54, the compressor portion 68, the combustor portion 70, and part of the turbine portion 72, may be aligned along the at least one central shaft 56. FIG. 1D further shows a FWD (forward)/AFT direction indicator 76.

In general, the compressor portion 68 (see FIG. 1D) compresses the air flow 90 (see FIG. 2) entering the core 24 (see FIG. 1D, the combustor portion 70 (see FIG. 1D) burns a mixture of fuel and the compressed air flow to generate a propulsive flow mixture, and the turbine portion 72 (see FIG. 1D) may be rotated by the propulsive flow mixture. Bypass air flow from the fan 42 typically provides thrust for the turbofan engine 10. The turbofan engine 10 described herein may employ a single-spool design, a two-spool design, a three-spool design, or another suitable turbofan machinery configuration. It will be appreciated by one skilled in the art that the structural components of the turbofan engine 10, as illustrated in FIG. 1D, represent a simplified assembly for illustrative purposes, and that the turbofan engine 10 may include additional structural components depending on the type of aircraft used and the type of propulsion and thrust required.

FIG. 2, discussed, in part, above, shows in another version of the disclosure, an aircraft 12 having a version of a turbofan engine 10, discussed in detail above, with a drag reduction system 11. As shown in FIG. 2, the aircraft 12 comprises the wings 14, such as the first wing 14a and the second wing 14b, and the fuselage 18. The first wing 14a and the second wing 14b are each attached to the fuselage 18. As further shown in FIG. 2, the aircraft 12 comprises turbofan engines 10 comprising the first turbofan engine 10a and the second turbofan engine 10b. The first turbofan engine 10a is attached to the first wing 14a and the second turbofan engine 10b is attached to the second wing 14b.

As further shown in FIG. 2, and as discussed above, the first turbofan engine 10a and the second turbofan engine 10b may each comprise a very-high-bypass-ratio engine 10c having a fan pressure ratio 36 in a range of from 1.10 to 1.30, and a bypass ratio 37 in a range of from 15 to 50, and the first turbofan engine 10a and the second turbofan engine 10b may each comprise a low-fan-pressure-ratio engine 10d having a length to diameter (L/D) ratio 38 of the fan cowl 26 in a range of from 0.6 to 1.0.

As further shown in FIG. 2, each of the first and second turbofan engines 10a, 10b comprises a core 24 with a fan cowl 26 surrounding a portion 28 (see FIG. 1A) of the core 24, and comprises an engine mount structure 35, such as a pylon 35a, or another suitable engine mount structure 35 for mounting the first and second turbofan engines 10a, 10b, to the respective wings 14a, 14b.

As further shown in FIG. 2, each of the first and second turbofan engines 10a, 10b comprises a drag reduction system 11. The drag reduction system 11 (see FIG. 2) comprises the fan 42 (see FIG. 2), such as the variable pitch fan (VPF) 42a, coupled to the first end 30 (see FIG. 1D) of the core 24 (see FIG. 2), and configured to only rotate in a first rotation direction 44a (see FIG. 2). The variable pitch fan 42a has a plurality of fan blades 46 (see FIG. 2) extending radially outward from the core 24 (see FIG. 2) to the fan cowl 26 (see FIG. 2). The plurality of fan blades 46 (see FIG. 2) are each configured to over-pitch to an over-pitch position 52a (see FIG. 2) relative to a feathered position 50 (see FIG. 2), such as beyond or past the feathered position 50, of the variable pitch fan 42a. As discussed above, each of the plurality of fan blades 46 is preferably configured to over-pitch to the over-pitch position 52a (see FIG. 2) relative to the feathered position 50 (see FIG. 2), such as beyond or past the feathered position 50, of the variable pitch fan 42a by an over-pitch 52 (see FIG. 2), or over-rotation, in a range of from 1 degree over-pitch to 10 degrees over-pitch. The feathered position 50 (see FIG. 2) is zero torque around the spin axis 51 (see FIG. 2), and is preferably a 38 degree rotation about the pitch axis 53 (see FIG. 2) of each fan blade 46 (see FIG. 2). As shown in FIG. 2, each fan blade 46 has a hub end 48a, a tip end 48b, a forward side 49a, and an aft side 49b.

As further shown in FIG. 2, the drag reduction system 11 for each of the first and second turbofan engines 10a, 10b comprises the plurality of outer guide vanes (OGVs) 54 in an OGV bank 55 axially disposed downstream of the variable pitch fan 42a. Each of the plurality of OGVs 54 (see FIG. 2) is nonrotatable and extends radially outward from the core 24 (see FIG. 2) to the fan cowl 26 (see FIG. 2). Each of the plurality of OGVs 54 (see FIG. 2) has a thickness to chord (t/c) ratio 64 (see FIG. 2) in a range of from 3% to 9%. The plurality of outer guide vanes (OGVs) 54 (see FIG. 2) preferably comprises a total number of OGVs 54 in a range of from 3 OGVs 54 to 24 OGVs 54. More preferably, the plurality of outer guide vanes (OGVs) 54 preferably comprises a total number of OGVs 54 in a range of from 16 OGVs 54 to 24 OGVs 54. As shown in FIG. 2, each OGV 54 has a root end 58a, a tip end 58b, a thickness 61, a leading edge 62a, and a trailing edge 62b. As discussed above, the core 24 is tapered at the second end 32, such that there is an annular bypass area reduction 66 (see FIG. 2) between the leading edge 62a and the trailing edge 62b of each of the plurality of outer guide vanes (OGVs) 54.

As further shown in FIG. 2, the drag reduction system 11 for each of the first and second turbofan engines 10a, 10b comprises a rotation control device 78 coupled to the variable pitch fan 42a, to prevent the variable pitch fan 42a from rotating in a second rotation direction 44b opposite the first rotation direction 44a, during the engine out (EO) condition 80 of the first turbofan engine 10a or the second turbofan engine 10b of the aircraft 12. As discussed above, the rotation control device 78 (see FIG. 2) may comprise a locking device 78a (see FIG. 2), a ratchet device 78b (see FIG. 2), or another suitable rotation control device 78. The rotation control device 78 (see FIG. 2) may be automatically and/or remotely controlled via a controller 82 (see FIG. 2) that activates and controls the rotation control device 78 when a turbofan engine 10 experiences an engine out (EO) condition 80 (see FIG. 2).

As discussed above, when the variable pitch fan 42a (see FIG. 2) is prevented from rotating in the second rotation direction 44b (see FIG. 2), and is mechanically changed from an unlocked position 85 (see FIG. 2) to a locked position 84 (see FIG. 2), during the engine out (EO) condition 80 (see FIG. 2), the plurality of fan blades 46 (see FIG. 2) are over-pitched to the over-pitch position 52a (see FIG. 2) relative to the feathered position 50 (see FIG. 2), such as beyond or past the feathered position 50, to achieve no or minimal air flow separation 92 (see FIG. 2) about the plurality of outer guide vanes (OGVs) 54, and to reduce drag 86 (see FIG. 2), such as the engine out (EO) drag 86a (see FIG. 2) of one, of the first turbofan engine 10a or the second turbofan engine 10b, during the engine out (EO) condition 80 (see FIG. 2). The drag 86 (see FIG. 2), such as the engine out (EO) drag 86a (see FIG. 2), may be reduced, and one of the first turbofan engine 10a or the second turbofan engine 10b, preferably has a reduced drag coefficient 88b (see FIG. 2). The drag 86 (see FIG. 2) may be reduced by a factor of one-third (⅓) or less, as compared to the drag for known turbofan engines without a locked and over-pitched variable pitch fan.

Figure 3:
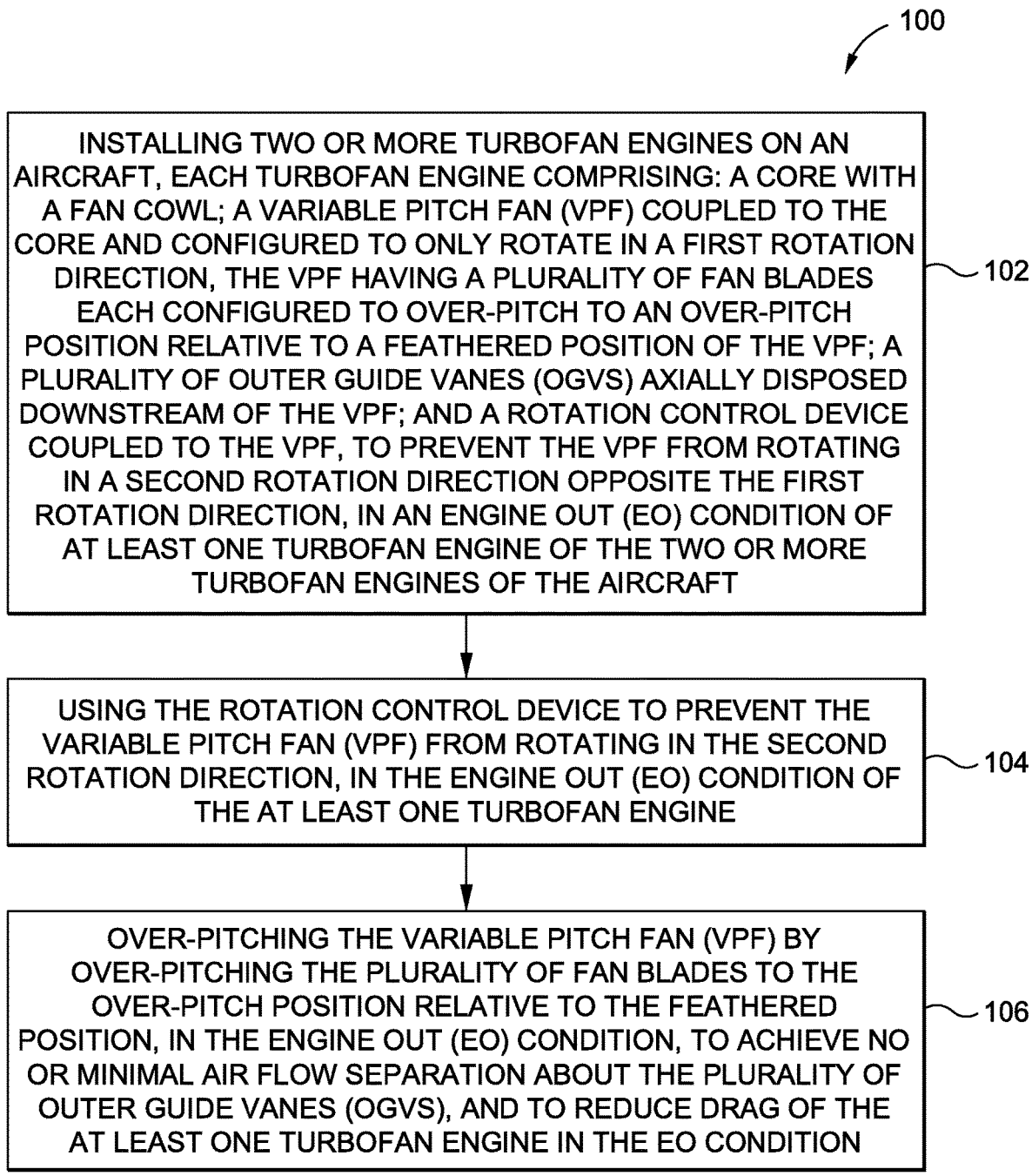
FIG. 3 is an illustration of a flow diagram of a version of a method of over-pitching a variable pitch fan (VPF) of a turbofan engine of an aircraft in an engine out (EO) condition to reduce drag.

Now referring to FIG. 3, in another version there is provided a method 100 of over-pitching a variable pitch fan (VPF) 42a (see FIGS. 1D, 2) of a turbofan engine 10 (see FIGS. 1A, 1D, 2) of an aircraft 12 (see FIGS. 1A, 2) in an engine out (EO) condition 80 (see FIG. 2) to reduce drag 86 (see FIG. 2). FIG. 3 is an illustration of a flow diagram of a version of the method 100 of over-pitching the variable pitch fan 42a of the turbofan engine 10 of the aircraft 12 in the engine out (EO) condition 80 to reduce drag 86.

As shown in FIG. 3, the method 100 comprises step 102 of installing two or more turbofan engines 10 (see FIGS. 1A, 1D, 2) on the aircraft 12 (see FIGS. 1A, 2). Preferably, the method 100 (see FIG. 3) comprises installing two turbofan engines 10 (see FIGS. 1A, 1D, 2) on the aircraft 12 (see FIGS. 1A, 2), where a first turbofan engine 10a (see FIGS. 1A, 2) is coupled or attached to the first wing 14a (see FIGS. 1A, 2) of the aircraft 12, and a second turbofan engine 10b (see FIGS. 1A, 2) is coupled or attached to the second wing 14b (see FIGS. 1A, 2) of the aircraft 12. As discussed in detail above, each turbofan engine 10 (see FIGS. 1A, 1D, 2) comprises a core 24 (see FIGS. 1A, 1D, 2) with a fan cowl 26 (see FIGS. 1A, 1D, 2) surrounding a portion 28 (see FIGS. 1A, 1D) of the core 24. The core 24 has a first end 30 (see FIGS. 1A, 1D) and a second end 32 (see FIGS. 1A, 1D).

The step 102 (see FIG. 3) of installing the two or more turbofan engines 10 on the aircraft 12 preferably comprises installing the two or more turbofan engines 10, wherein each turbofan engine 10 comprises a very-high-bypass-ratio engine 10c having a fan pressure ratio 36 in a range of from 1.10 to 1.30. Other fan pressure ratios 36 outside the 1.10 to 1.30 range may also be suitable. The step 102 (see FIG. 3) of installing two or more turbofan engines 10 on the aircraft 12 preferably comprises installing the two or more turbofan engines 10, wherein each turbofan engine 10 comprises a low-fan-pressure-ratio engine 10d having a length to diameter (L/D) ratio 38 of the fan cowl 26 of each turbofan engine 10 in a range of from 0.6 to 1.0.

As discussed above, each turbofan engine 10 further comprises a variable pitch fan 42a coupled to the first end 30 of the core 24 and configured to only rotate in a first rotation direction 44a. The variable pitch fan 42a has a plurality of fan blades 46 extending radially outward from the core 24 to the fan cowl 26, the plurality of fan blades 46 each configured to over-pitch to an over-pitch position 52a (see FIG. 2) relative to a feathered position 50 (see FIG. 2), such as beyond or past the feathered position 50, of the variable pitch fan 42a.

As discussed above, each turbofan engine 10 further comprises a plurality of outer guide vanes (OGVs) 54 axially disposed downstream of the variable pitch fan 42a. Each of the plurality of OGVs 54 is nonrotatable and extends radially outward from the core 24 to the fan cowl 26. Each turbofan engine 10 further comprises a rotation control device 78 coupled to the variable pitch fan 42a, to prevent the variable pitch fan 42a from rotating in a second rotation direction 44b opposite the first rotation direction 44a, in an engine out (EO) condition 80 of the at least one turbofan engine 10 of the two or more turbofan engines 10 of the aircraft 12.

As shown in FIG. 3, the method 100 further comprises step 104 of using the rotation control device 78 to prevent the variable pitch fan 42a from rotating in the second rotation direction 44b, in the engine out (EO) condition 80 of the at least one turbofan engine 10. As discussed above, the rotation control device 78 (see FIG. 2) may comprise a locking device 78a (see FIG. 2), a ratchet device 78b (see FIG. 2), or another suitable rotation control device 78. The rotation control device 78 (see FIG. 2) may be automatically and/or remotely controlled via a controller 82 (see FIG. 2)

that activates and controls the rotation control device 78 when a turbofan engine 10 experiences an engine out (EO) condition 80 (see FIG. 2).

As shown in FIG. 3, the method 100 further comprises step 106 of over-pitching the variable pitch fan 42a by over-pitching the plurality of fan blades 46 to the over-pitch position 52a (see FIG. 2) relative to the feathered position 50 (see FIG. 2), such as beyond or past the feathered position 50, in the engine out (EO) condition 80 (see FIG. 2), to achieve no or minimal air flow separation 92 (see FIG. 2) about the plurality of outer guide vanes (OGVs) 54, and to reduce drag 86 (see FIG. 2), such as engine out (EO) drag 86a (see FIG. 2), of the at least one turbofan engine 10 in the engine out (EO) condition 80.

The step 106 (see FIG. 3) of over-pitching the variable pitch fan 42a by over-pitching the plurality of fan blades 46 to the over-pitch position 52a (see FIG. 2) relative to the feathered position 50 (see FIG. 2) may comprise over-pitching the plurality of fan blades 46 to the over-pitch position 52a (see FIG. 2) relative to the feathered position 50 (see FIG. 2), such as beyond or past the feathered position 50, of the variable pitch fan 42 by an over-pitch 52, or over-rotation, in a range of from 1 degree over-pitch to 10 degrees over-pitch. The step 106 (see FIG. 3) of over-pitching the variable pitch fan 42a by over-pitching the plurality of fan blades 46 to the over-pitch position 52a (see FIG. 2) relative to the feathered position 50 (see FIG. 2) may further comprise biasing in a positive direction 98a a swirl angle 96 (see FIG. 2) of swirl 94 (see FIG. 2) generated aft of the variable pitch fan 42a and generated by the variable pitch fan 42a. The step 106 (see FIG. 3) of over-pitching the variable pitch fan 42a by over-pitching the plurality of fan blades 46 to the over-pitch position 52a (see FIG. 2) relative to the feathered position 50 (see FIG. 2) may further comprise reducing the drag 86 (see FIG. 2), such as the engine out (EO) drag 86a (see FIG. 2), of the at least one turbofan engine 10 in the engine out (EO) condition 80 (see FIG. 2), wherein the at least one turbofan engine 10 has a reduced drag coefficient 88b (see FIG. 2).

Figure 4:
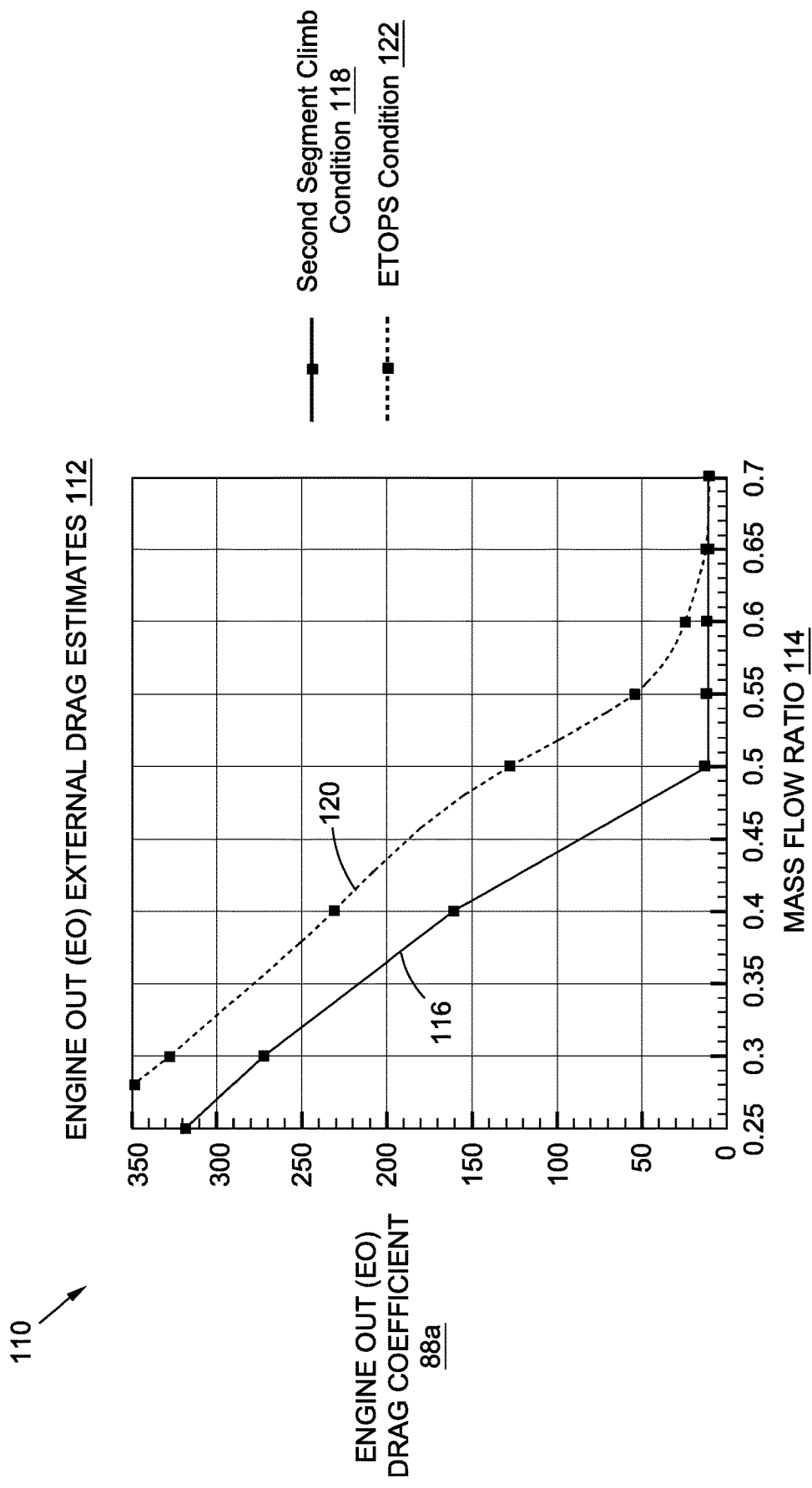
FIG. 4 is an illustration of a graph showing engine out (EO) external drag estimates for a version of a turbofan engine, as disclosed herein.

Now referring to FIG. 4, FIG. 4 is an illustration of a graph 110 showing engine out (EO) external drag estimates 112 per fan cowl 26 (see FIG. 1A), or nacelle, for a version of the turbofan engine 10 (see FIGS. 1A-1D), as disclosed herein. As shown in FIG. 4, the graph 110 shows engine out (EO) drag coefficient 88a along a vertical axis, and mass flow ratio 114 along a horizonal axis. The engine out (EO) drag coefficient 88a was derived from a thrust drag bookkeeping method. The thrust drag bookkeeping method is based on computational fluid dynamics and is used to decompose the thrust of an engine exhaust system and the drag of an airframe.

As further shown in FIG. 4, the graph 110 shows a second segment climb curve 116 representing a second segment climb condition 118 of an aircraft with the turbofan engines 10 right after take-off of the aircraft. As further shown in FIG. 4, the graph 110 shows an ETOPS curve 120 representing an ETOPS condition 122, or extended operations condition, of an aircraft with the turbofan engines 10. ETOPS applies to two-engine aircraft when the aircraft is more than 60 minutes from an airport, and ETOPS applies to aircraft with more than two engines, when the aircraft is more than 180 minutes from an airport, where the distances are determined using an approved one-engine inoperative cruise speed under standard atmospheric conditions in still air. As further shown in FIG. 4, at about 0.66 mass flow ratio 114, both the second segment climb curve 116 and the ETOPS curve 120 have a low or minimal engine out (EO) drag coefficient 88a of about 10 counts at an engine out (EO) condition 80 (see FIG. 2), which means low or minimal air flow blockage through the fan cowl 26, or nacelle, of the turbofan engine 10.

Now referring to FIG. 5, FIG. 5 is an illustration of a graph 124 showing the results of an over-pitch past feather effect 126 on engine out (EO) drag 86a at an ETOPS condition 122, using a powered simulation 132 (see FIGS. 6A-6B, 7A-7E), such as a three-dimensional powered simulation, and a powered model 130 (see FIG. 6A), such as a three-dimensional powered model, having a plurality of outer guide vanes (OGVs) 54 (see FIG. 6A), when the fan blades 46 (see FIGS. 1D, 2) of a variable pitch fan 42a (see FIG. 2) were over-pitched or over-rotated, relative to the feathered position 50 (see FIG. 2), at various over-pitch positions 52a (see FIG. 2). As used herein, "powered" for the powered model 130 (see FIGS. 6A-6B) and the powered simulation 132 (see FIGS. 6A-6B), means that an air flow 90 (see FIG. 2) is charged with flow through levels of total pressure and temperature. The powered model 130 and powered simulations 132 are discussed in further detail below with regard to FIGS. 6A-7E.

As shown in FIG. 5, the graph 124 shows a percentage of engine out (EO) drag reduction 86c along a vertical axis, and an over-pitch angle 52b, measured in degrees, along a horizonal axis. The over-pitch angle 52b, or over-rotation angle, starting at 0 (zero) means a feathered position 50 (see FIG. 2) of about 35 degrees, and the over-pitch angle 52b is the amount, in degrees, of over-pitch 52 (see FIG. 2), or amount of over-rotation, past feather or past the feathered position 50 (see FIG. 2). For example, in FIG. 5, the over-pitch angle 52b at 2 degrees past feather, or past the feathered position 50, is 37 degrees, the over-pitch angle 52b at 4 degrees past feather, or past the feathered position 50, is 39 degrees, the over-pitch angle 52b at 6 degrees past feather, or past the feathered position 50, is 41 degrees, the over-pitch angle 52b at 8 degrees past feather, or past the feathered position 50, is 43 degrees, and the over-pitch angle 52b at 10 degrees past feather, or past the feathered position 50, is 45 degrees.

As further shown in FIG. 5, the graph 124 shows a curve 128 representing the over-pitch past feather effect 126 on engine out (EO) drag 86a at the ETOPS condition 122. The ETOPS condition 122, or extended operations condition, for the powered simulation 132 (see FIGS. 6A-6B), using the powered model 130 (see FIGS. 6A-6B) of the turbofan engine 10 (see FIG. 6A), had a Mach number of 0.56 and an altitude of 20,000 feet. As discussed above, ETOPS applies to two-engine aircraft when the aircraft is more than 60 minutes from an airport, and ETOPS applies to aircraft with more than two engines, when the aircraft is more than 180 minutes from an airport, where the distances are determined using an approved one-engine inoperative cruise speed under standard atmospheric conditions in still air.

As further shown in FIG. 5, the percentage of engine out (EO) drag reduction 86c increased as the over-pitch angle 52b increased. For example, in FIG. 5, the over-pitch angle 52b at 2 degrees past feather, or past the feathered position 50, showed an engine out (EO) drag reduction 86c of about 8%, the over-pitch angle 52b at 4 degrees past feather, or past the feathered position 50, showed an engine out (EO) drag reduction 86c of 15%, the over-pitch angle 52b at 6 degrees past feather, or past the feathered position 50, showed an engine out (EO) drag reduction 86c of slightly over 20%, the over-pitch angle 52b at 8 degrees past feather, or past the feathered position 50, showed an engine out (EO) drag reduction 86c of about 24%, and the over-pitch angle 52b at 10 degrees past feather, or past the feathered position 50, showed an engine out (EO) drag reduction 86c of about 26%.

Figure 6A:
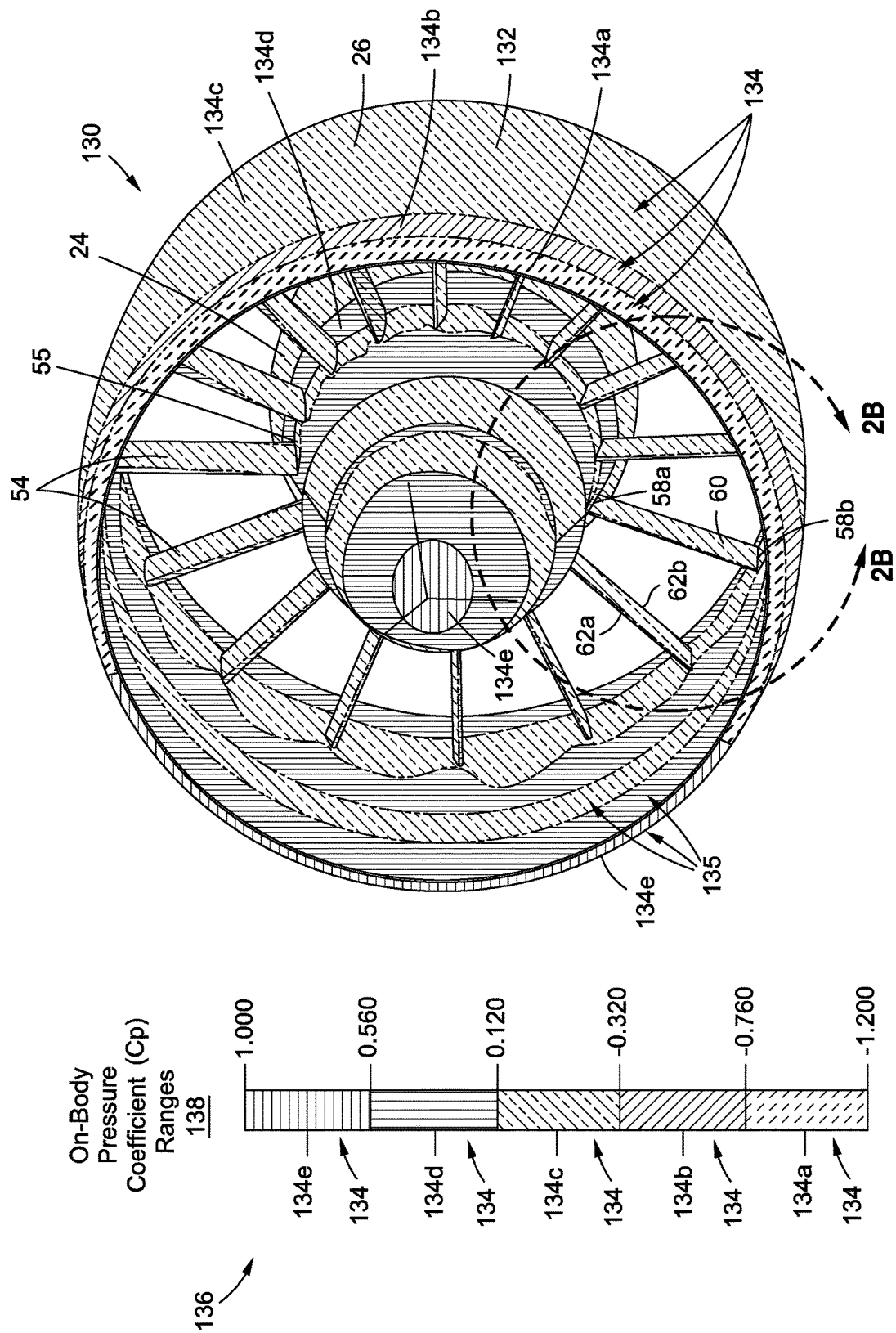
FIG. 6A is an illustration of a front perspective view of a powered model used in a powered simulation, showing on-body surface regions of on-body pressure coefficient at various on-body pressure coefficient ($C_P$) ranges.
Figure 6B:
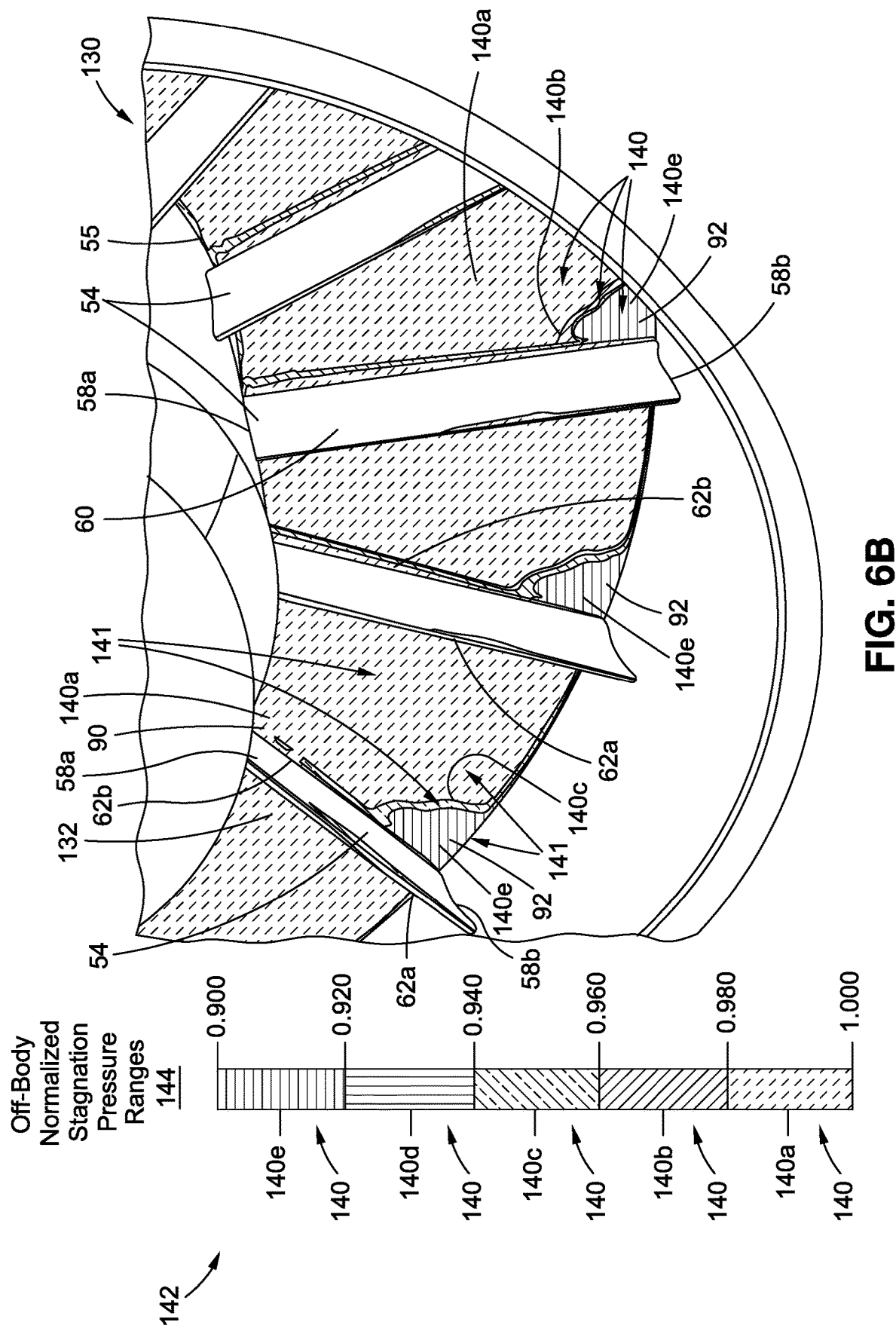
FIG. 6B is an illustration of a close-up of circle portion 2B-2B of the powered model of FIG. 6A, showing off-body interrogation planes of stagnation pressure at various off-body normalized stagnation pressure ranges.

Now referring to FIGS. 6A-6B, FIG. 6A is an illustration of a front perspective view of a powered model 130, such as a three-dimensional powered model, used in a powered simulation 132, such as a three-dimensional powered simulation, showing on-body surface regions 134 of on-body pressure coefficient 135 at various on-body pressure coefficient ($C_P$) ranges 138, and FIG. 6B is an illustration of a close-up of circle portion 2B-2B of the powered model 130 of FIG. 6A, showing off-body interrogation planes 140 of stagnation pressure 141, at various off-body normalized stagnation pressure ranges 144. FIG. 6B further shows air flow separation 92 behind the tip end 58b of the OGV 54. FIG. 6B only shows the off-body interrogation planes 140 and does not show the on-body surface regions 134 (see FIG. 6A) of the OGVs 54 (see FIG. 6A) at various on-body pressure coefficient ($C_P$) ranges 138 (see FIG. 6A). As discussed above, "powered" for the powered model 130 (see FIGS. 6A-6B) and the powered simulation 132 (see FIGS. 6A-6B), means that the air flow 90 (see FIG. 2) is charged with flow through levels of total pressure and temperature.

As shown in FIGS. 6A-6B, the powered model 130 is a model of a turbofan engine 10 (see FIGS. 1A-1D) with a plurality of outer guide vanes (OGVs) 54 in an outer guide vane (OGV) bank 55. As further shown in FIGS. 6A-6B, each outer guide vane (OGV) 54 in the powered model 130 includes the root end 58a, the tip end 58b, the body 60, the leading edge 62a, and the trailing edge 62b. As shown in FIG. 6A, the powered model 130 of the turbofan engine 10 further includes the fan cowl 26 and the core 24.

The powered simulation 132 (see FIGS. 6A-6B) using the powered model 130 (see FIGS. 6A-6B) was carried out at an ETOPS condition 122 (see FIG. 5), at a Mach number of 0.56, at an altitude of 20,000 feet, at a mass flow ratio (MFR) 114 (see FIG. 2) of 0.6617, at a mass flow ratio (MFR) 114 (see FIG. 2) in the fan nozzle 75 (see FIG. 2) of 0.6551, at a drag coefficient ($C_D$) 88 of 25 counts. Although FIGS. 6A-6B do not show a fan 42 (see FIG. 1D), such as a variable pitch fan (VPF) 42a (see FIG. 1D), in the powered model 130, the air flow 90 (see FIG. 2) through the powered model 130 shown in FIGS. 6A-6B was a flow through and simulated a feathered position 50 of the plurality of fan blades 46 (see FIG. 2) with no over-pitch, that is, at a zero degree over-pitch 52c (see FIG. 2) past the feathered position 50, where the feathered position 50 (see FIG. 2) was a 38 degree pitch. Swirl 94 (see FIG. 6B) in the form of radially varying swirl 94a (see FIG. 6B), was defined for the feathered position 50 (see FIG. 2) of 38 degrees, as 26 degrees of swirl 94 at the hub end 48a (see FIG. 2) of each fan blade 46 (see FIG. 2), and −13 degrees of swirl 94 (see FIG. 2) at the tip end 48b (see FIG. 2) of each fan blade 46. FIG. 6B shows the feathered position 50 with no over-pitch 52 (see FIG. 2).

The powered simulation 132 (see FIG. 6A) using the powered model 130 (see FIG. 6A), was carried out using the conditions as indicated above, and FIG. 6A shows on-body surface regions 134 of on-body pressure coefficient 135 on the powered model 130, where the on-body surface regions 134 correspond to a legend 136 of the on-body surface regions 134 of on-body pressure coefficient 135 at various on-body pressure coefficient ($C_P$) ranges 138. As shown in FIG. 6A, a first on-body surface region 134a corresponds to an on-body pressure coefficient ($C_P$) range 138 between −1.200 $C_P$ and −0.760 $C_P$; a second on-body surface region 134b corresponds to an on-body pressure coefficient ($C_P$) range 138 between −0.760 $C_P$ and −0.320 $C_P$; a third on-body surface region 134c corresponds to an on-body pressure coefficient ($C_P$) range 138 between −0.320 $C_P$ and 0.120 $C_P$; a fourth on-body surface region 134d corresponds to an on-body pressure coefficient ($C_P$) range 138 between 0.120 $C_P$ and 0.560 $C_P$; and a fifth on-body surface region 134e corresponds to an on-body pressure coefficient ($C_P$) range 138 between 0.560 $C_P$ and 1.000 $C_P$.

The powered simulation 132 (see FIG. 6B) using the powered model 130 (see FIG. 6B), was carried out using the conditions as indicated above, and FIG. 6B shows off-body interrogation planes 140 of stagnation pressure 141 and air flow separation 92 behind the outer guide vanes (OGVs) 54, where the off-body interrogation planes 140 correspond to a legend 142 of the off-body interrogation planes 140 of stagnation pressure 141 at various off-body normalized stagnation pressure ranges 144. As shown in FIG. 6B, a first off-body interrogation plane 140a corresponds to an off-body normalized stagnation pressure range 144 between 1.000 and 0.980; a second off-body interrogation plane 140b corresponds to an off-body normalized stagnation pressure range 144 between 0.980 and 0.960; a third off-body interrogation plane 140c corresponds to an off-body normalized stagnation pressure range 144 between 0.960 and 0.940; a fourth off-body interrogation plane 140d corresponds to an off-body normalized stagnation pressure range 144 between 0.940 and 0.920; and a fifth off-body interrogation plane 140e corresponds to an off-body normalized stagnation pressure range 144 between 0.920 and 0.900.

As shown in FIG. 6B, the fifth off-body interrogation plane 140e behind the trailing edge 62b of the tip end 58b of the outer guide vanes (OGVs) 54 shows air flow separation 92, which was undesirable. As further shown in FIG. 6B, the first off-body interrogation plane 140a behind the trailing edge 62b of the root end 58a of the outer guide vanes (OGVs) 54 shows air flow 90 that was well attached and not separated, which was desirable.

Now referring to FIGS. 7A-7E, FIGS. 7A-7E are illustrations of a powered model 130, such as a three-dimensional powered model, used in a powered simulation 132, such as a three-dimensional powered simulation, showing a side close-up view of an outer guide vane (OGV) 54, and showing the effect of varying an over-pitch 52 (see FIG. 2) on air flow separation 92 behind the OGV 54. FIGS. 7A-7E each show the legend 136 of the on-body surface regions 134 on the OGV 54 of on-body pressure coefficient 135 at various on-body pressure coefficient ($C_P$) ranges 138, where the first on-body surface region 134a corresponds to the on-body pressure coefficient ($C_P$) range 138 between −1.200 $C_P$ and −0.760 $C_P$; the second on-body surface region 134b corresponds to the on-body pressure coefficient ($C_P$) range 138 between −0.760 $C_P$ and −0.320 $C_P$; the third on-body surface region 134c corresponds to the on-body pressure coefficient ($C_P$) range 138 between −0.320 $C_P$ and 0.120 $C_P$; the fourth on-body surface region 134d corresponds to the on-body pressure coefficient ($C_P$) range 138 between 0.120 $C_P$ and 0.560 $C_P$; and the fifth on-body surface region 134e corresponds to the on-body pressure coefficient ($C_P$) range 138 between 0.560 $C_P$ and 1.000 $C_P$.

Further, FIGS. 7A-7E each show the legend 142 of the off-body interrogation planes 140 of stagnation pressure 141, and air flow separation 92 behind the OGV 54 at various off-body normalized stagnation pressure ranges 144, where the first off-body interrogation plane 140a corresponds to the off-body normalized stagnation pressure range 144 between 1.000 and 0.980; the second off-body interrogation plane 140b corresponds to the off-body normalized stagnation pressure range 144 between 0.980 and 0.960; the third off-body interrogation plane 140c corresponds to the off-body normalized stagnation pressure range 144 between 0.960 and 0.940; the fourth off-body interrogation plane 140d corresponds to the off-body normalized stagnation pressure range 144 between 0.940 and 0.920; and the fifth off-body interrogation plane 140e corresponds to the off-body normalized stagnation pressure range 144 between 0.920 and 0.900.

Further, FIGS. 7A-7E each show the root end 58a, the tip end 58b, the leading edge 62a, and the trailing edge 62b of the outer guide vane (OGV) 54 of the powered model 130, and each show the on-body pressure coefficient 135 on the OGV 54 and the stagnation pressure 141 behind the OGV 54. Further, FIGS. 7A-7E show the effect of over-pitch 52 (see FIG. 2) on the presence or absence of air flow separation 92 behind, or aft of, the outer guide vane (OGV) 54.

Figure 7A:
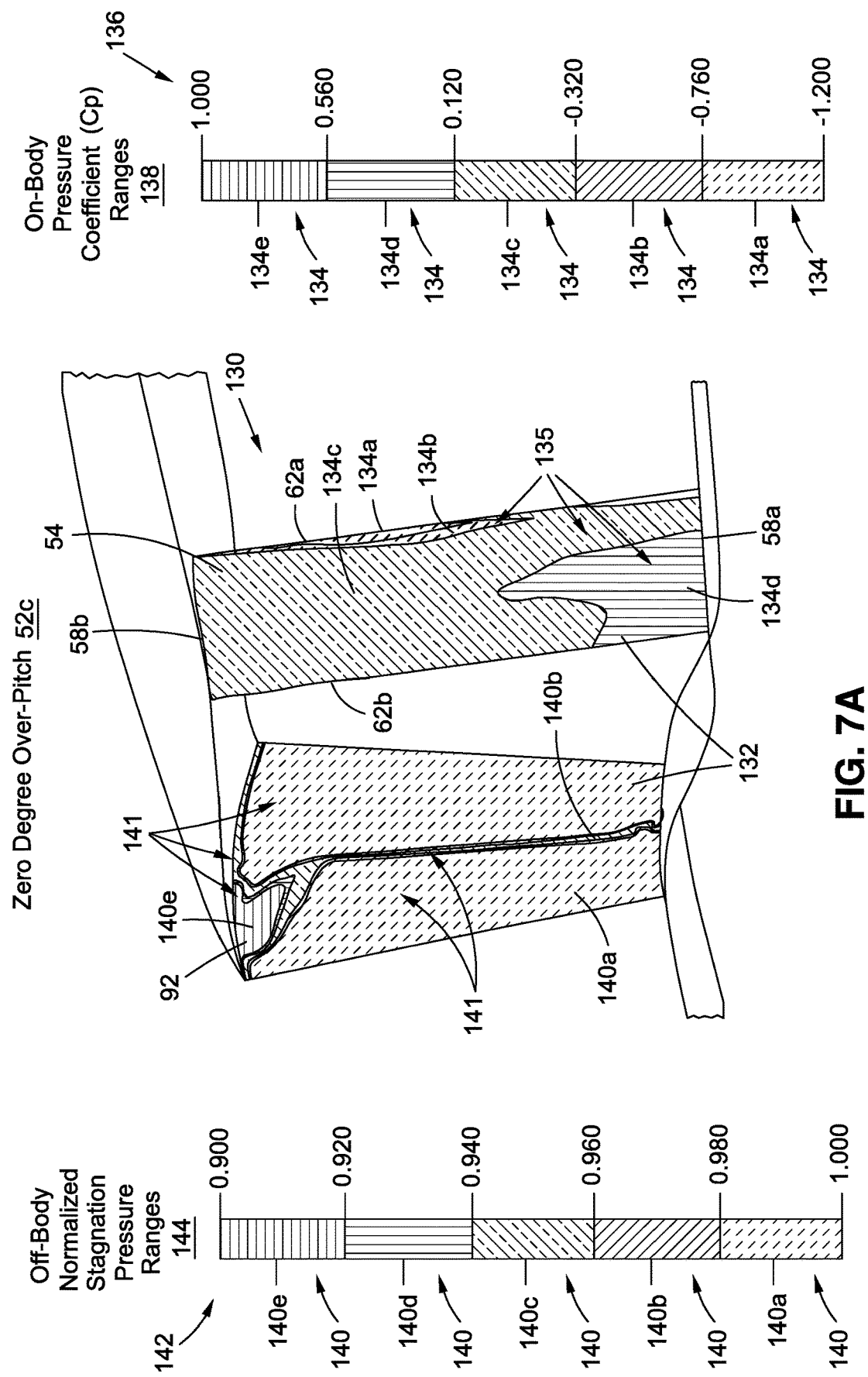

FIG. 7A is an illustration of the powered simulation 132 showing a close-up of the outer guide vane (OGV) 54 and the on-body pressure coefficient 135 on the OGV 54 and the stagnation pressure 141 behind the OGV 54, where the variable pitch fan 42a (see FIG. 2) was at the feathered position 50 (see FIG. 2) and there was a zero degree over-pitch 52c relative to the feathered position 50, such as beyond or past the feathered position 50 (see FIG. 2). As shown in FIG. 7A, there was air flow separation 92 present behind the trailing edge 62b of the tip end 58b of the OGV 54. FIG. 7A shows the baseline condition with the variable pitch fan 42a (see FIG. 2) in the feathered position 50 (see FIG. 2) and with no over-pitch 52 (see FIG. 2) of the fan blades 46 (see FIG. 2).

Figure 7B:
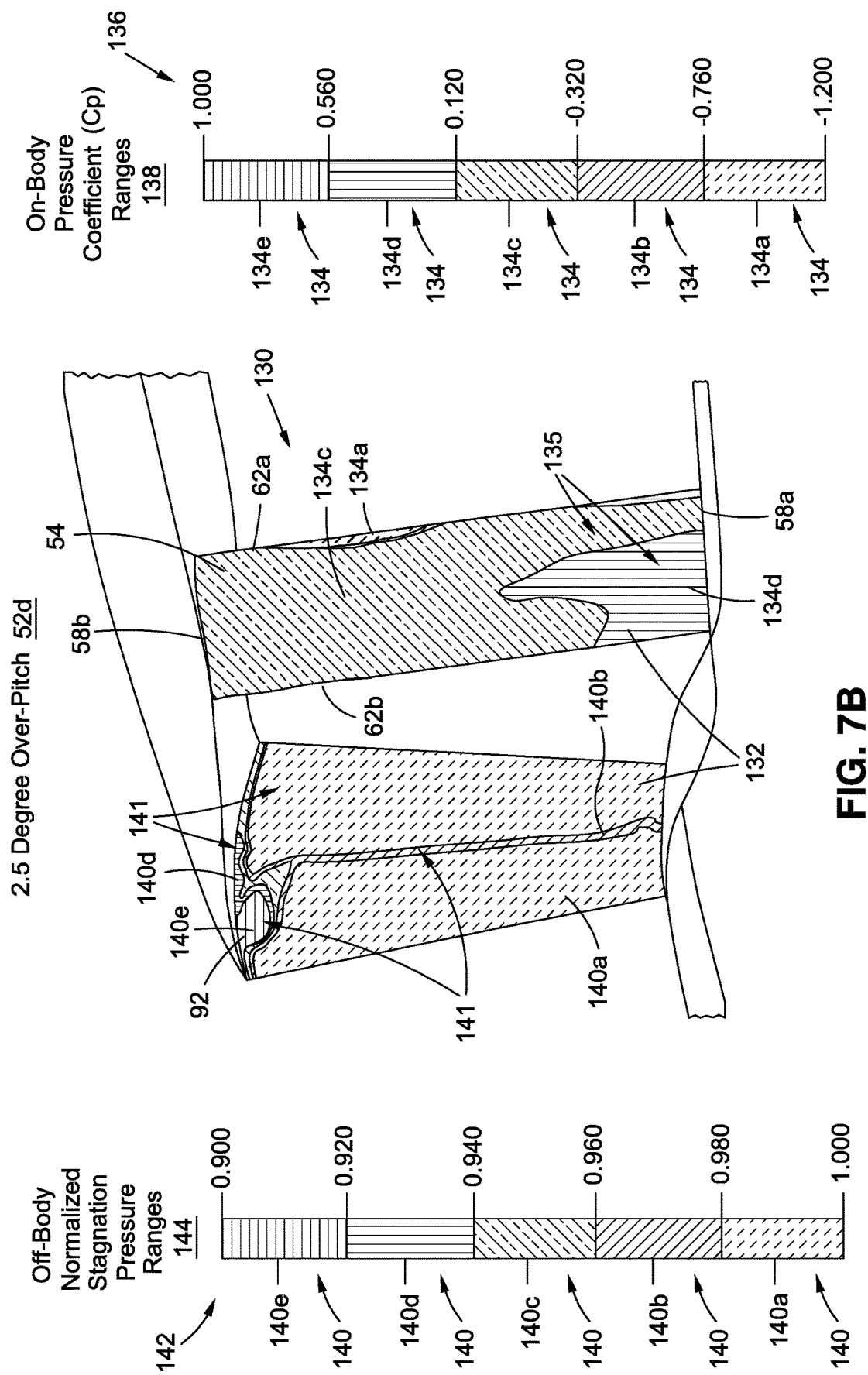

FIG. 7B is an illustration of the powered simulation 132 showing a close-up of the outer guide vane (OGV) 54 and the on-body pressure coefficient 135 on the OGV 54 and the stagnation pressure 141 behind the OGV 54, where the variable pitch fan 42a (see FIG. 2) was over-pitched at the over-pitch position 52a (see FIG. 2) of a 2.5 degree over-pitch 52d relative to the feathered position 50, such as beyond or past the feathered position 50 (see FIG. 2). As shown in FIG. 7B, some air flow separation 92 was present behind the trailing edge 62b of the tip end 58b of the OGV 54, but the amount of air flow separation 92 present at the 2.5 degree over-pitch 52d was less than the amount of air flow separation 92 present at the zero degree over-pitch 52c of the feathered position 50.

Figure 7C:
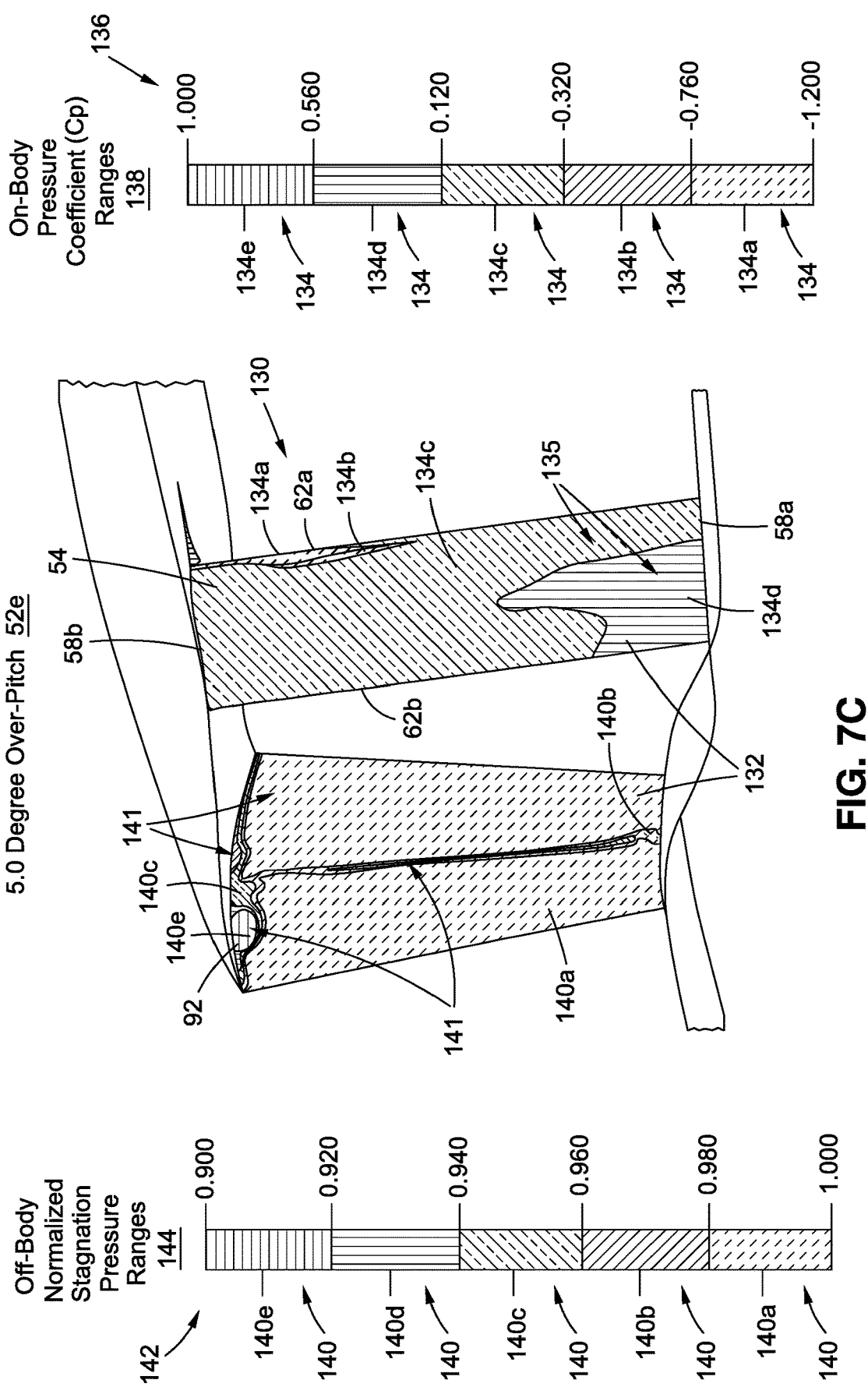

FIG. 7C is an illustration of the powered simulation 132 showing a close-up of the outer guide vane (OGV) 54 and the on-body pressure coefficient 135 on the OGV 54 and the stagnation pressure 141 behind the OGV 54, where the variable pitch fan 42a (see FIG. 2) was over-pitched at the over-pitch position 52a (see FIG. 2) of a 5.0 degree over-pitch 52e relative to the feathered position 50, such as beyond or past the feathered position 50 (see FIG. 2). As shown in FIG. 7C, some air flow separation 92 was present behind the trailing edge 62b of the tip end 58b of the OGV 54, but the amount of air flow separation 92 present at the 5.0 degree over-pitch 52e was less than the amount of air flow separation 92 present at the 2.5 degree over-pitch 52d, and was less than the amount of air flow separation 92 present at the zero degree over-pitch 52c of the feathered position 50.

Figure 7D:
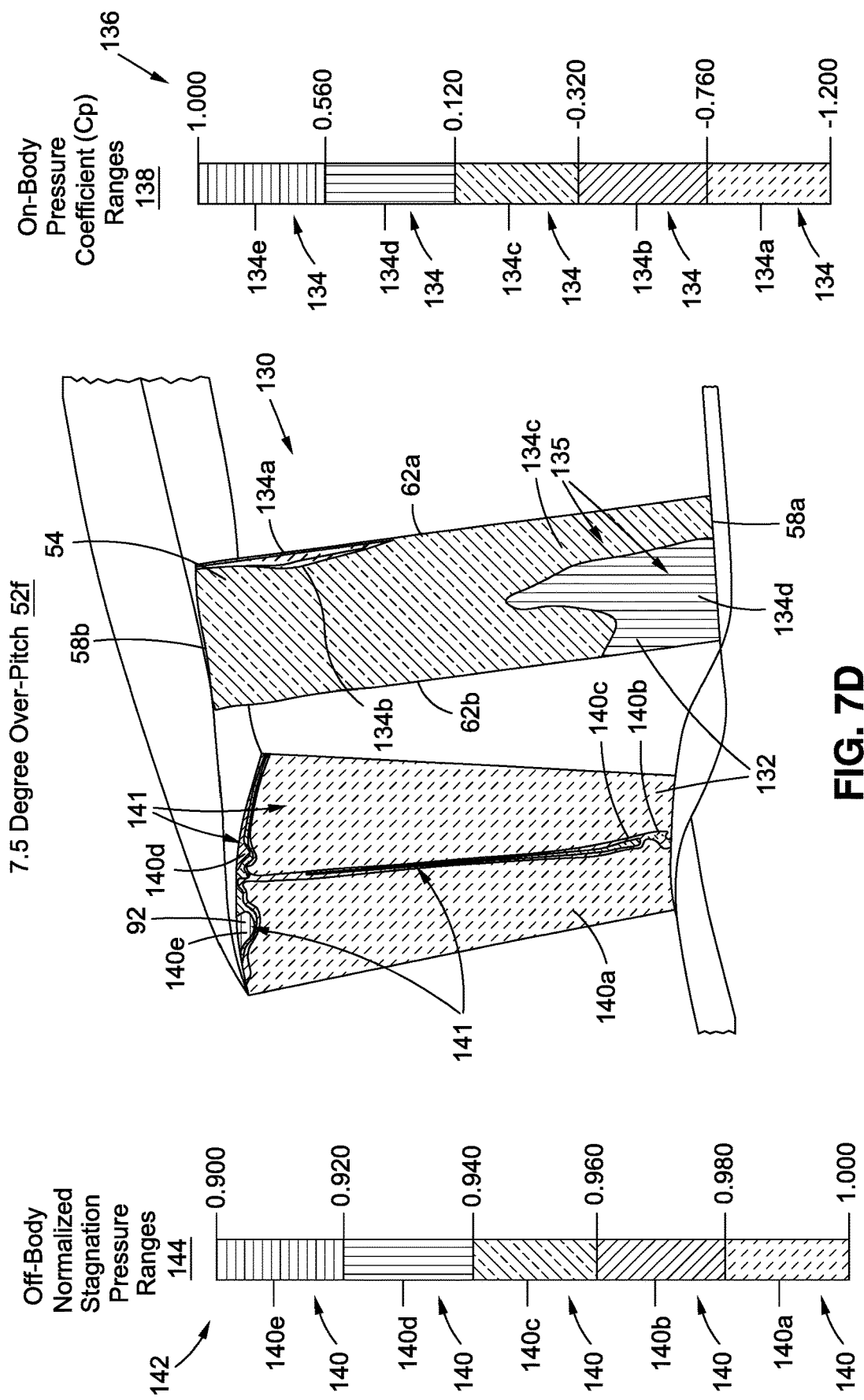

FIG. 7D is an illustration of a powered simulation 132 showing a close-up of the outer guide vane (OGV) 54 and the on-body pressure coefficient 135 on the OGV 54 and the stagnation pressure 141 behind the OGV 54, where the variable pitch fan 42a (see FIG. 2) was over-pitched at the over-pitch position 52a (see FIG. 2) of a 7.5 degree over-pitch 52f relative to the feathered position 50, such as beyond or past the feathered position 50 (see FIG. 2). As shown in in FIG. 7D, a small amount of air flow separation 92 was present behind the trailing edge 62b of the tip end 58b of the OGV 54, but the amount of air flow separation 92 present at the 7.5 degree over-pitch 52f was less than the amount of air flow separation 92 present at the 5.0 degree over-pitch 52e, was less than the amount of air flow separation 92 present at the 2.5 degree over-pitch 52d, and was less than the amount of air flow separation 92 present at the zero degree over-pitch 52c of the feathered position 50.

FIG. 7E is an illustration of a powered simulation 132 showing a close-up of the outer guide vane (OGV) 54 and the on-body pressure coefficient 135 on the OGV 54 and the stagnation pressure 141 behind the OGV 54, where the variable pitch fan 42a (see FIG. 2) was over-pitched at the over-pitch position 52a (see FIG. 2) of a 10 degree over-pitch 52g relative to the feathered position 50, such as beyond or past the feathered position 50 (see FIG. 2). As shown in FIG. 7E, no air flow separation 92 (see FIGS. 7A-7D) was present behind the trailing edge 62b of the tip end 58b of the OGV 54.

Thus, as shown in FIGS. 7A-7E, the effect of over-pitch 52 (see FIG. 2) on air flow separation 92 behind or aft of the outer guide vane (OGV) 54 and about the OGV 54 showed that over-pitching at 2.5 degree over-pitch 52d, 5.0 degree over-pitch 52e, 7.5 degree over-pitch 52f, 10 degree over-pitch 52g, all 52g relative to the feathered position 50, such as beyond or past the feathered position 50 (see FIG. 2), result in no air flow separation 92 or minimal air flow separation 92 behind the trailing edge 62b of the tip end 58b of the OGV 54 and about the OGV 54, and result in less air flow separation 92 than the amount of air flow separation 92 present at no over-pitch or zero degree over-pitch 52c at the feathered position 50 (see FIG. 2)F. No air flow separation 92 or minimal air flow separation 92 about the plurality of OGVs 54 reduces drag 86 (see FIG. 2), such as engine out (EO) drag 86a (see FIG. 2), of the turbofan engine 10 during an engine out (EO) condition 80 (see FIG. 2).

With low-fan-pressure-ratio engines 10c (see FIG. 2), such as having a fan pressure ratio in a range of 1.10 to 1.30, if the fan 42 (see FIG. 2), such as the variable pitch fan (VPF) 42a (see FIG. 2), is feathered, the swirl angles 96 (see FIG. 2) of the swirl 94 (see FIG. 2) may be small enough such that the design of the outer guide vanes (OGVs) 54 (see FIG. 2) may accommodate the engine out (EO) condition 80 (see FIG. 2) with some air flow separation 94 (see FIG. 2), but without incurring air flow separation 92 (see FIG. 2) that is total or complete. However, it was found that over-pitching the plurality of fan blades 46 (see FIG. 2) to obtain the over-pitched fan blades 46a (see FIG. 2) and varying the over-pitch (see FIG. 2), as shown in FIGS. 7B-7D, achieved minimal air flow separation 92 or no air flow separation 92 (see FIGS. 7B-7D) behind or about the OGVs 54 (see FIGS. 7B-7D), which significantly reduces the drag 86 (see FIG. 2), such as the engine out (EO) drag 86b (see FIG. 2).

Figure 8:
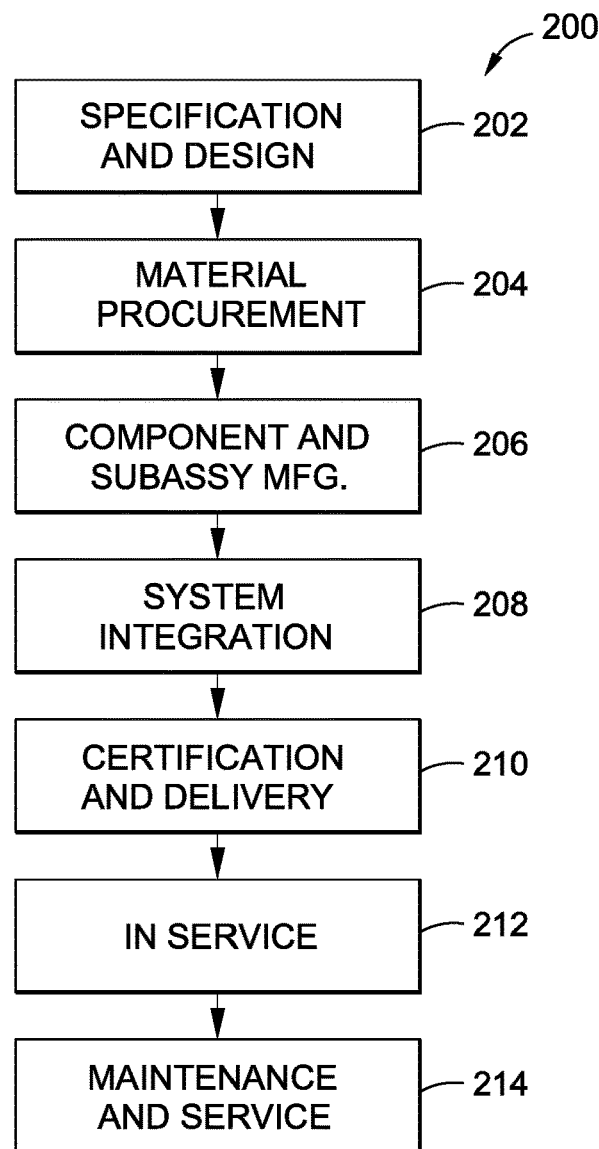
FIG. 8 is an illustration of a flow diagram of an aircraft manufacturing and service method.
Figure 9:
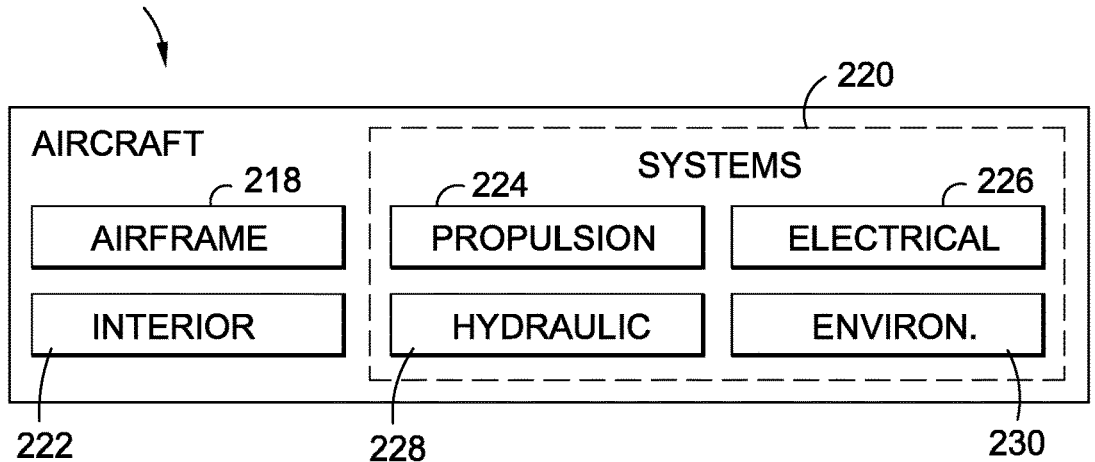
FIG. 9 is an illustration of a block diagram of an aircraft.

Now referring to FIGS. 8 and 9, FIG. 8 is an illustration of a flow diagram of an aircraft manufacturing and service method 200, and FIG. 9 is an illustration of a block diagram of an aircraft 216. Referring to FIGS. 8 and 9, versions of the disclosure may be described in the context of the aircraft manufacturing and service method 200 as shown in FIG. 8, and the aircraft 216 as shown in FIG. 9.

During pre-production, exemplary aircraft manufacturing and service method 200 may include specification and design 202 of the aircraft 216 and material procurement 204. During manufacturing, component and subassembly manufacturing 206 and system integration 208 of the aircraft 216 takes place. Thereafter, the aircraft 216 may go through certification and delivery 210 in order to be placed in service 212. While in service 212 by a customer, the aircraft 216 may be scheduled for routine maintenance and service 214 (which may also include modification, reconfiguration, refurbishment, and other suitable services).

Each of the processes of the aircraft manufacturing and service method 200 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 9, the aircraft 216 produced by the exemplary aircraft manufacturing and service method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

Methods and systems embodied herein may be employed during any one or more of the stages of the aircraft manufacturing and service method 200. For example, components or subassemblies corresponding to component and subassembly manufacturing 206 may be fabricated or manufactured in a manner similar to components or subassemblies produced while the aircraft 216 is in service 212. Also, one or more apparatus versions, method versions, or a combination thereof, may be utilized during component and subassembly manufacturing 206 and system integration 208, for example, by substantially expediting assembly of or reducing the cost of the aircraft 216. Similarly, one or more of apparatus versions, method versions, or a combination thereof, may be utilized while the aircraft 316 is in service 212, for example and without limitation, to maintenance and service 214.

Disclosed versions of the turbofan engine 10 (see FIGS. 1A-1D, 2) for an aircraft 12 (see FIGS. 1A, 2), and the method 100 (see FIG. 3) of over-pitching the fan 42 (see FIGS. 1D, 2), such as the variable pitch fan (VPF) 42a (see FIGS. 1D, 2) of the turbofan engine 10 of the aircraft 12 in the engine out (EO) condition 80 (see FIG. 2) to reduce drag 86 (see FIG. 2) provide a solution to significantly reduce the drag 86, such as engine out (EO) drag 86a (see FIG. 2), of very-high-bypass-ratio engines 10c (see FIG. 2) and low-fan-pressure-ratio engines 10d (see FIG. 2), so that the engine out (EO) drag 86a may be comparable or less than that of a known turbofan engine with less frontal area, for example, one-third (⅓) the frontal area of the turbofan engine 10.

Moreover, disclosed versions of the turbofan engine 10 (see FIGS. 1A-1D, 2) for an aircraft 12 (see FIGS. 1A, 2), and the method 100 (see FIG. 3) of over-pitching the fan 42 (see FIGS. 1D, 2), such as the variable pitch fan (VPF) 42a (see FIGS. 1D, 2) of the turbofan engine 10 of the aircraft 12 in the engine out (EO) condition 80 (see FIG. 2) to reduce drag 86 (see FIG. 2) configure a fan 42 (see FIG. 2), such as a variable pitch fan (VPF) 42a (see FIG. 2) to only have rotation along one direction, such as a first rotation direction 44a, and configure the fan 42 (see FIG. 2), such as the variable pitch fan (VPF) 42a (see FIG. 2), for an over-pitch 52 (see FIG. 2), or over-rotation, to provide for an air flow 90 (see FIG. 2) received by the outer guide vanes (OGVs) 54 (see FIG. 2) that is optimal, and that has no or minimal air flow separation 92 (see FIG. 2). The over-pitch position 52a (see FIG. 2) relative to the feathered position 50 (see FIG. 2), such as beyond or past the feathered position 50 (see FIG. 2), enables superior performance of the turbofan engine 10 (see FIG. 1D, 2), as compared to smaller known engines. Over-pitching the plurality of fan blades 46 (see FIG. 2), as discussed above, may result in a drag reduction 86b (see FIG. 2), such as an engine out (EO) drag reduction 86c (see FIG. 2), of about 25% to 30%, as compared to known engines having fans without such over-pitching.

In addition, disclosed versions of the turbofan engine 10 (see FIGS. 1A-1D, 2) for an aircraft 12 (see FIGS. 1A, 2), and the method 100 (see FIG. 3) of over-pitching the fan 42 (see FIGS. 1D, 2), such as the variable pitch fan (VPF) 42a (see FIGS. 1D, 2) of the turbofan engine 10 of the aircraft 12 in the engine out (EO) condition 80 (see FIG. 2) to reduce drag 86 (see FIG. 2) provide for intentionally locking the fan 42, such as the variable pitch fan 42a, with the rotation control device 78 (see FIG. 2) coupled to the variable pitch fan 42a, to lock or prevent the variable pitch fan 42a from rotating or spinning in the second rotation direction 44b (FIG. 2) opposite the first rotation direction 44a (see FIG. 2), so that the variable pitch fan 42a can only rotate or spin in its normal operating direction, e.g., the first rotation direction 44a, during the engine out (EO) condition 80. The rotation control device 78 (see FIG. 2) may be automatically and/or remotely controlled to lock the variable pitch fan 42a, when a turbofan engine 10 experiences the engine out (EO) condition 80. After the variable pitch fan 42a is locked, or simultaneously to the variable pitch fan 42a being locked, the plurality of fan blades 46 (see FIG. 2) may then preferably be automatically over-pitched or over-rotated relative to the feathered position 50 (see FIG. 2), to an over-pitch position 52a (see FIG. 2) that is desired. This biases in a positive direction 98a (see FIG. 2) a swirl angle 96 (see FIG. 2) of swirl 94 (see FIG. 2) generated aft of the variable pitch fan 42a by the variable pitch fan 42a, and the air flow 90 (see FIG. 2) flows about the outer guide vanes (OGVs) 54 with no or minimal air flow separation 92 (see FIG. 2) behind the OGVs 54.

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. A turbofan engine for an aircraft, the turbofan engine comprising:
   a core with a fan cowl surrounding a portion of the core, the core having a first end and a second end;
   a variable pitch fan (VPF) coupled to the first end of the core and configured to only rotate in a first rotation direction, the variable pitch fan having a plurality of fan blades extending radially outward from the core to the fan cowl, the plurality of fan blades each configured to over-pitch to an over-pitch position relative to a feathered position of the variable pitch fan;
   a plurality of outer guide vanes (OGVs) axially disposed downstream of the variable pitch fan, each of the plurality of outer guide vanes (OGVs) being nonrotatable and extending radially outward from the core to the fan cowl; and a rotation control device comprising a ratchet device, the rotation control device coupled to a portion of a central shaft aligned along a longitudinal center axis of the turbofan engine, and the central shaft, in turn, coupled to the variable pitch fan, the rotation control device preventing the variable pitch fan from rotating in a second rotation direction opposite the first rotation direction, during an engine out (EO) condition of the turbofan engine for the aircraft, wherein when the variable pitch fan is prevented from rotating in the second rotation direction during the engine out (EO) condition, the plurality of fan blades are over-pitched to the over-pitch position relative to the feathered position, to achieve no or minimal air flow separation about the plurality of outer guide vanes (OGVs), and to reduce drag of the turbofan engine during the engine out (EO) condition.

2. The turbofan engine of claim 1, wherein the turbofan engine comprises a very-high-bypass-ratio engine having a fan pressure ratio in a range of from 1.10 to 1.30.

3. The turbofan engine of claim 1, wherein the turbofan engine comprises a low-fan-pressure-ratio engine having a length to diameter (L/D) ratio of the fan cowl of the turbofan engine in a range of from 0.6 to 1.0.

4. The turbofan engine of claim 1, wherein each of the plurality of fan blades is configured to be over-pitched to the over-pitch position relative to the feathered position of the variable pitch fan, by an over-pitch in a range of from 1 degree over-pitch to 10 degrees over-pitch.

5. The turbofan engine of claim 1, wherein the plurality of outer guide vanes (OGVs) comprise a total number of OGVs in a range of from 3 OGVs to 24 OGVs.

6. The turbofan engine of claim 1, wherein the plurality of outer guide vanes (OGVs) each has a thickness to chord (t/c) ratio in a range of from 3% to 9%.

7. The turbofan engine of claim 1, wherein the core is tapered at the second end, such that there is an annular bypass area reduction between a leading edge and a trailing edge of each of the plurality of outer guide vanes (OGVs).

8. The turbofan engine of claim 1, wherein the plurality of outer guide vanes (OGVs) each has a root end coupled to the core and a tip end coupled to the fan cowl.

9. The turbofan engine of claim 1, wherein the drag is reduced, and the turbofan engine has a reduced drag coefficient.

10. An aircraft comprising:
a fuselage;
a first wing and a second wing, each attached to the fuselage;
a first turbofan engine attached to the first wing and a second turbofan engine attached to the second wing, each turbofan engine comprising:
a core with a fan cowl surrounding a portion of the core, the core having a first end and a second end; and,
a drag reduction system comprising:
a variable pitch fan (VPF) coupled to the first end of the core and configured to only rotate in a first rotation direction, the variable pitch fan having a plurality of fan blades extending radially outward from the core to the fan cowl, the plurality of fan blades each configured to over-pitch to an over-pitch position relative to a feathered position of the variable pitch fan;

a plurality of outer guide vanes (OGVs) axially disposed downstream of the variable pitch fan, each of the plurality of outer guide vanes (OGVs) being nonrotatable and extending radially outward from the core to the fan cowl, and each of the plurality of outer guide vanes (OGVs) having a thickness to chord (t/c) ratio in a range of from 3% to 9%.; and a rotation control device comprising a ratchet device, the rotation control device coupled to a portion of a central shaft aligned along a longitudinal center axis of the turbofan engine, and the central shaft, in turn, coupled to the variable pitch fan, the rotation control device preventing the variable pitch fan from rotating in a second rotation direction opposite the first rotation direction, during an engine out (EO) condition of one of, the first turbofan engine or the second turbofan engine, of the aircraft, wherein when the variable pitch fan is prevented from rotating in the second rotation direction during the engine out (EO) condition, the plurality of fan blades are over- pitched to the over-pitch position relative to a feathered position, to achieve no or minimal air flow separation about the plurality of outer guide vanes (OGVs), and to reduce an engine out (EO) drag.

11. The aircraft of claim 10, wherein the first turbofan engine and the second turbofan engine each comprises a very-high-bypass-ratio engine having a fan pressure ratio in a range of from 1.10 to 1.30.

12. The aircraft of claim 10, wherein the first turbofan engine and the second turbofan engine each comprises a low-fan-pressure-ratio engine having a length to diameter (L/D) ratio of the fan cowl of each of the first turbofan engine and the second turbofan engine, in a range of from 0.6 to 1.0.

13. The aircraft of claim 10, wherein the plurality of outer guide vanes (OGVs) comprise a total number of OGVs in a range of from 3 OGVs to 24 OGVs.

14. The aircraft of claim 10, wherein each of the plurality of fan blades is configured to be over-pitched to the over-pitch position relative to the feathered position of the variable pitch fan, by an over-pitch in a range of from 1 degree over-pitch to 10 degrees over-pitch.

15. A method of over-pitching a variable pitch fan (VPF) of a turbofan engine of an aircraft in an engine out (EO) condition to reduce drag, the method comprising the steps of:
installing two or more turbofan engines on the aircraft, each turbofan engine comprising:
a core with a fan cowl surrounding a portion of the core, the core having a first end and a second end;
the variable pitch fan coupled to the first end of the core and configured to only rotate in a first rotation direction, the variable pitch fan having a plurality of fan blades extending radially outward from the core to the fan cowl, the plurality of fan blades each configured to over-pitch to an over-pitch position relative to a feathered position of the variable pitch fan;
a plurality of outer guide vanes (OGVs) axially disposed downstream of the variable pitch fan, each of the plurality of outer guide vanes (OGVs) being nonrotatable and extending radially outward from the core to the fan cowl; and a rotation control device comprising a ratchet device, the rotation control device coupled to a portion of a central shaft aligned along a longitudinal center axis of the turbofan engine, and the central shaft, in turn, coupled to the variable pitch fan, the rotation control device preventing the variable pitch fan from rotating in a second rotation direction opposite the first rotation direction, in an engine out (EO) condition of at least one turbofan engine of the two or more turbofan engines of the aircraft, using the rotation control device to prevent the variable pitch fan from rotating in the second rotation direction, in the engine out (EO) condition of the at least one turbofan engine; and over-pitching the variable pitch fan, by over-pitching the plurality of fan blades to the over-pitch position relative to the feathered position, in the engine out (EO) condition, to achieve no or minimal air flow separation about the plurality of outer guide vanes (OGVs), and to reduce drag of the at least one turbofan engine in the engine out (EO) condition.

16. The method of claim 15, wherein installing the two or more turbofan engines on the aircraft comprises installing the two or more turbofan engines, wherein each turbofan engine comprises a very-high-bypass-ratio engine having a fan pressure ratio in a range of from 1.10 to 1.30.

17. The method of claim 15, wherein installing the two or more turbofan engines on the aircraft comprises installing the two or more turbofan engines, wherein each turbofan engine comprises a low-fan-pressure-ratio engine having a length to diameter (L/D) ratio of the fan cowl of each turbofan engine in a range of from 0.6 to 1.0.

18. The method of claim 15, wherein over-pitching the variable pitch fan further comprises over-pitching the plurality of fan blades to the over-pitch position relative to the feathered position of the variable pitch fan, by an over-pitch in a range of from 1 degree over-pitch to 10 degrees over-pitch.

19. The method of claim 15, wherein over-pitching the variable pitch fan further comprises biasing in a positive direction a swirl angle of swirl generated aft of the variable pitch fan by the variable pitch fan.

20. The method of claim 15, wherein over-pitching the variable pitch fan further comprises reducing the drag of the one turbofan engine in the engine out (EO) condition, wherein the at least one turbofan engine in the engine out (EO) condition has a reduced drag coefficient.

* * * * *